(12) United States Patent
Collura et al.

(10) Patent No.: US 11,782,919 B2
(45) Date of Patent: Oct. 10, 2023

(54) USING METADATA PRESENCE INFORMATION TO DETERMINE WHEN TO ACCESS A HIGHER-LEVEL METADATA TABLE

(71) Applicant: International Business Machines Corporation, Armonk, NY (US)

(72) Inventors: Adam Benjamin Collura, Hopewell Junction, NY (US); James Bonanno, Liberty Hill, TX (US); Brian Robert Prasky, Campbell Hall, NY (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 17/406,452

(22) Filed: Aug. 19, 2021

(65) Prior Publication Data

US 2023/0053733 A1   Feb. 23, 2023

(51) Int. Cl.
*G06F 16/24* (2019.01)
*G06F 16/2453* (2019.01)
*G06F 16/21* (2019.01)

(52) U.S. Cl.
CPC ........ *G06F 16/2453* (2019.01); *G06F 16/211* (2019.01)

(58) Field of Classification Search
CPC ............... G06F 16/211; G06F 16/2453; G06F 12/0855; G06F 12/0897; G06F 9/3842; G06F 2212/466; G06F 2212/6032
See application file for complete search history.

(56) References Cited

U.S. PATENT DOCUMENTS

| | | | |
|---|---|---|---|
| 8,078,803 B2 * | 12/2011 | Speier | G06F 12/0897 |
| | | | 711/144 |
| 9,280,351 B2 | 3/2016 | Bonanno et al. | |
| 9,298,465 B2 | 3/2016 | Bonanno et al. | |
| 9,411,598 B2 | 8/2016 | Bonanno et al. | |
| 10,394,559 B2 | 8/2019 | Bonanno et al. | |
| 10,481,912 B2 | 11/2019 | Bonanno et al. | |
| 10,754,781 B2 | 8/2020 | Bonanno et al. | |
| 10,908,784 B2 | 2/2021 | Boucher et al. | |
| 10,983,670 B2 | 4/2021 | Boucher et al. | |
| 11,526,465 B2 * | 12/2022 | Shetty | G06F 16/211 |

(Continued)

OTHER PUBLICATIONS

International Search Report; International Application No. PCT EP2022/072825; International Filing Date: Aug. 16, 2022; dated Dec. 13, 2022; 13 pages.

(Continued)

*Primary Examiner* — Kris E Mackes
*Assistant Examiner* — Tiffany Thuy Bui
(74) *Attorney, Agent, or Firm* — Jeffrey Ingalls; Cantor Colburn LLP

(57) ABSTRACT

Embodiments are provided for using metadata presence information to determine when to access a higher-level metadata table. It is determined that an incomplete hit occurred for a line of metadata in a lower-level structure of a processor, the lower-level structure being coupled to a higher-level structure in a hierarchy. It is determined that metadata presence information in a metadata presence table is a match to the line of metadata from the lower-level structure. Responsive to determining the match, it is determined to avoid accessing the higher-level structure of the processor.

20 Claims, 30 Drawing Sheets

(56) References Cited

U.S. PATENT DOCUMENTS

| | | | | |
|---|---|---|---|---|
| 2008/0183967 | A1* | 7/2008 | Speier | G06F 12/0897 |
| | | | | 711/122 |
| 2010/0023695 | A1* | 1/2010 | Guthrie | G06F 12/0817 |
| | | | | 711/E12.024 |
| 2010/0122032 | A1* | 5/2010 | Cypher | G06F 12/0897 |
| | | | | 711/E12.024 |
| 2011/0202727 | A1* | 8/2011 | Speier | G06F 12/128 |
| | | | | 711/E12.024 |
| 2012/0089782 | A1* | 4/2012 | McKean | G06F 12/0866 |
| | | | | 711/E12.024 |
| 2013/0246708 | A1* | 9/2013 | Ono | G06F 12/0862 |
| | | | | 711/E12.024 |
| 2013/0339692 | A1 | 12/2013 | Bonanno et al. | |
| 2017/0371790 | A1 | 12/2017 | Dwiel et al. | |
| 2018/0225219 | A1* | 8/2018 | Jalal | G06F 12/128 |
| 2019/0087344 | A1* | 3/2019 | Hijaz | G06F 12/128 |
| 2019/0114263 | A1 | 4/2019 | Olorode et al. | |
| 2019/0179300 | A1 | 6/2019 | Cella et al. | |
| 2020/0257534 | A1* | 8/2020 | Bonanno | G06F 9/3806 |
| 2021/0049239 | A1 | 2/2021 | Li et al. | |
| 2022/0114108 | A1* | 4/2022 | Koker | G06F 12/126 |

OTHER PUBLICATIONS

Anonymous, "Minimizing the costly update of persistant meta-data in multi-teir enviroment by using metadata fileter"; ip.com; IPCOM000244214D; Nov. 24, 2015; 9p.

Anonymous; "System and Method for Metadata enrichment for Search system via presence server and mail service"; ip.com IPCOM000185259D; Jul. 17, 2009; 9p.

Anonymously; "Graph Aware Caching Policy for Distributed Graph Stores"; IPCOM000240727D; ip.com Feb. 23, 2015; 6 pages.

Anonymously; "Machine-Learned Caching of Datasets"; ip.com IPCOM000252027D; Dec. 14, 2017; 38 p.

Anoymous; "A System and Method for Providing Meta-Data Model Based Distributed Data Validation"; ip.com IPCOM000214707D; Feb. 3, 2021; 8p.

Bonanno et al., "Integrated Semi-Inclusive Hierarchical Metadata Predictor", U.S. Appl. No. 17/406,438, filed Aug. 19, 2021.

Brown; "Fast Thread Migration via CacheWorking Set Prediction"; Proceedings of the 17th International Symposium on High Performance Computer Architecture HPCA; 2011; 12p.

Burcea; "Predictor Virtualization"; ASPLOS'08 Mar. 1-5, 2008; ACM; 11 p.

Elbert; "Predictive Caching of Video Content in 5G Networks Based on Motion and Content Consumption Analysis"; ip.com IPCOM000250951D; Sep. 18, 2017; 6p.

Huang; "A Hierarchical Location Prediction Neural Network for Twitter User Geolocation"; Proceedings of the 2019 Conference on Empirical Methods in Natural Language Processing and the 9th International Joint Conference on Natural Language Processing, pp. 4732-4742, Hong Kong, China, Nov. 3-7, 2019, 11 p.

List of IBM Patents or Patent Applications Treated as Related; Date Filed: Aug. 18, 2021, 2 pages.

Lu. "Extending the Lifetime of Flash-based Storage through Reducing Write Amplification from File Systems"; 1th USENIX Conference on File and Storage Technologies (FAST '13), 2013; 14p.

Mohammed; "Meta-data and Data Mart solutions for better understanding for data and information in E-government Monitoring"; IJCSI International Journal of Computer Science Issues, vol. 9, Issue 6, No. 3, Nov. 2012; 6p.

Shi. "A Hierarchical Neural Model of Data Prefetching"; ASPLOS '21, Apr. 19-23, 2021, Virtual; 13p.

Woodley; "Crosswalks, Metadata Harvesting, Federated Searching, Metasearching: Using Metadata to Connect Users and Information"; Introduction to Metadata 3.0 © 2008 J. Paul Getty Trust; Crosswalks, Metadata Harvesting, Federated Searching, Metasearching; 2008, 25p.

* cited by examiner

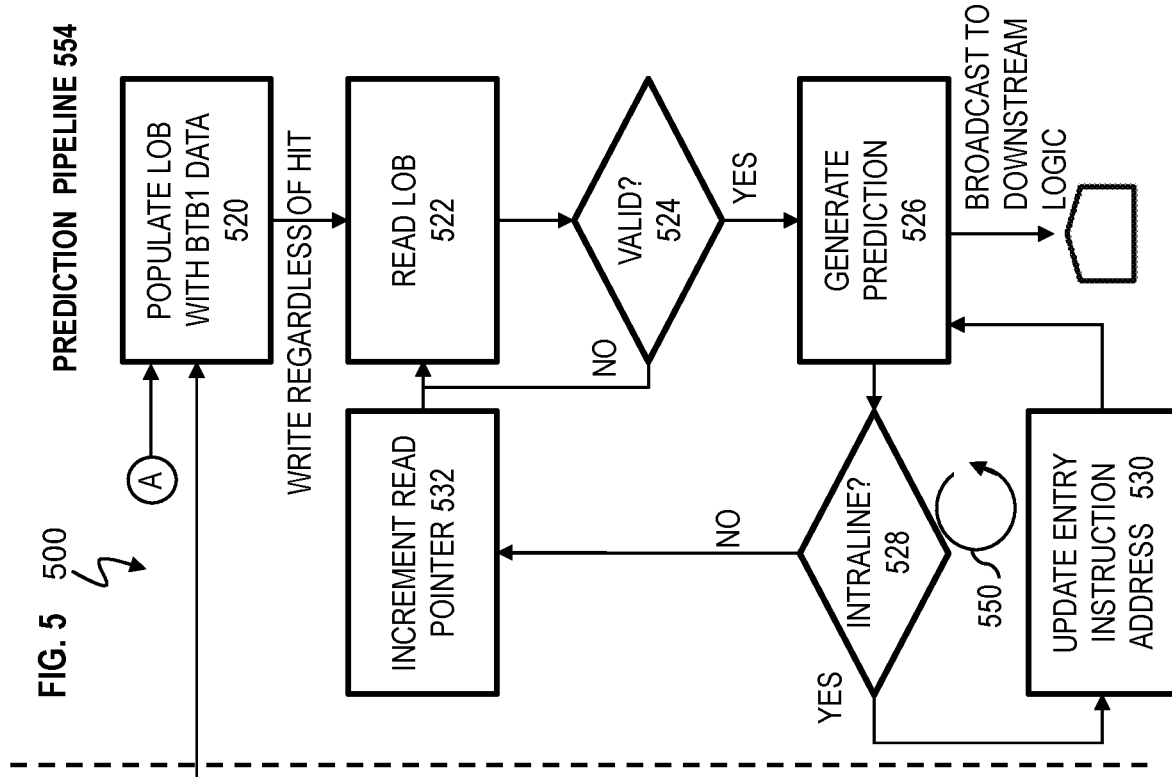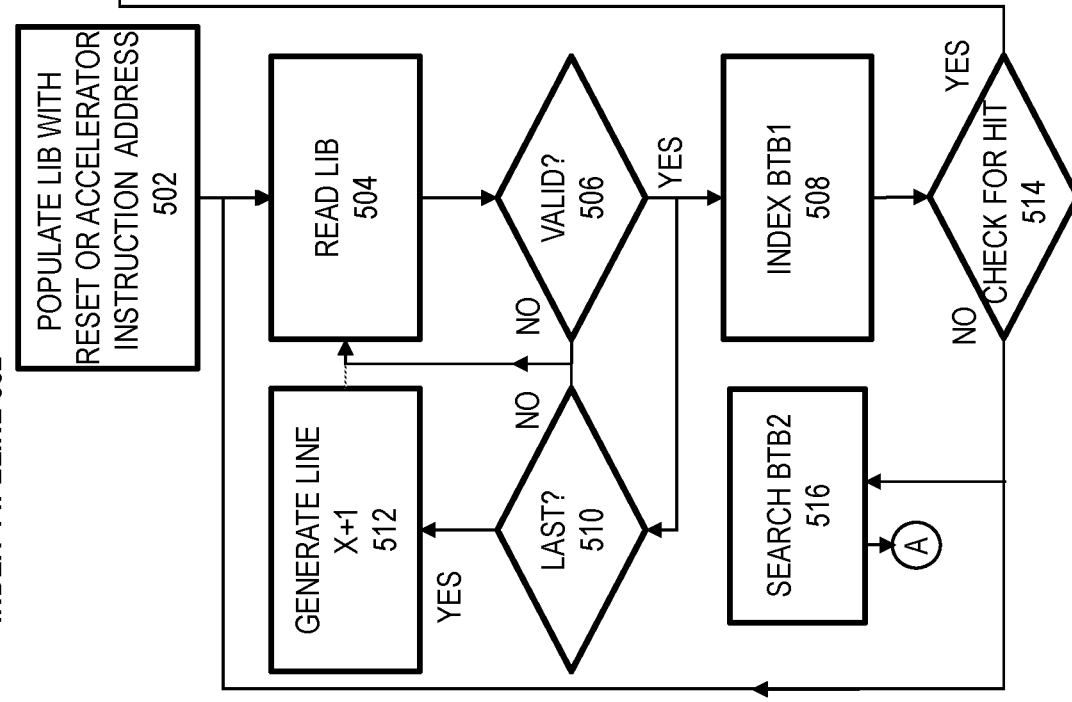
FIG. 5

USING METADATA PRESENCE INFORMATION TO DETERMINE WHEN TO ACCESS A HIGHER-LEVEL METADATA TABLE

BACKGROUND

The present invention generally relates to computer systems, and more specifically, to computer-implemented methods, computer systems, and computer program products configured and arranged for using metadata presence information to determine when to access a higher-level metadata table.

A pipeline microprocessor has a path, channel, or pipeline that is divided into stages that perform specific tasks. Each of the specific tasks is part of an overall operation that is directed by a programmed instruction. Each of the programmed instructions or macro instructions in a software application program is executed in sequence by the microprocessor. As a programmed instruction enters the first stage of the pipeline, certain tasks are accomplished. The instruction is then passed to subsequent stages for accomplishment of subsequent tasks. Following completion of a final task, the instruction completes execution and exits the pipeline. Aspects of execution of programmed instructions by a pipeline microprocessor are analogous to the manufacture of items on an assembly line. One of the aspects of any assembly line is that there are multiple items resident in the line in successive stages of assembly during any given point in time. The same is true for a pipeline microprocessor. During any cycle of a pipeline clock signal, there are multiple instructions present in the various stages, with each of the instructions being at successive levels of completion. Therefore, microprocessors allow overlapping execution of multiple instructions with the same circuitry. The circuitry is usually divided up into stages and each stage processes a specific part of one instruction at a time, passing the partial results to the next stage.

Instructions may have branches, and processors attempt use various information to predict the outcome of the branch in order to speed up processing. Although existing processors have been suitable for their intended purposes, what is needed are systems and methods having certain features of embodiments of the present invention.

SUMMARY

Embodiments of the present invention are directed to computer-implemented methods for using metadata presence information to determine when to access a higher-level metadata table. A non-limiting example computer-implemented method includes determining that an incomplete hit occurred for a line of metadata in a lower-level structure of a processor, the lower-level structure being coupled to a higher-level structure in a hierarchy. Also, the computer-implemented method includes determining that metadata presence information in a metadata presence table is a match to the line of metadata from the lower-level structure, and responsive to determining the match, determining to avoid accessing the higher-level structure of the processor.

This can provide an improvement over known methods for a metadata predictor by incorporating metadata presence information to avoid/eliminate the need for sacrificial or unnecessary access to a higher-level structure. The higher-level structure is accessed when it is recognized that metadata presence information indicates that it is more beneficial to take time to access the higher-level structure, so as to avoid a larger stall due to misprediction and pipeline restart.

In addition to one or more of the features described above or below, or as an alternative, in further embodiments of the invention the metadata presence information identifies a presence of one or more branches different from the line of metadata. Thus, a technique is advantageously provided to identify when the line of metadata is missing the presence of a known branch.

In addition to one or more of the features described above or below, or as an alternative, in further embodiments of the invention, responsive to determining that the metadata presence information in the metadata presence table identifies a presence of one or more branches different from the line of metadata, the higher-level structure is accessed for the line of metadata. Thus, a technique advantageously uses the metadata presence information to recognize that the higher-level structure is accessed for the line of metadata.

In addition to one or more of the features described above or below, or as an alternative, in further embodiments of the invention a prediction pipeline is stalled and the higher-level structure is accessed for the line of metadata, responsive to the metadata presence information identifying a presence of one or more branches different from the line of metadata. Thus, a technique advantageously identifies when to temporarily stall the prediction pipeline to access the higher-level structure, thereby avoiding a much longer stall because of a misprediction and restart of the prediction pipeline.

In addition to one or more of the features described above or below, or as an alternative, in further embodiments of the invention responsive to determining a miss associated with an instruction cache and responsive to determining that the incomplete hit occurred for the line of metadata in the lower-level structure, the higher-level structure is accessed for the line of metadata; and/or responsive to determining a hit associated with the instruction cache, responsive to determining that the incomplete hit occurred for the line of metadata in the lower-level structure, and responsive to determining that the metadata presence information in the metadata presence table identifies a presence of one or more branches different from the line of metadata, the higher-level structure is accessed for the line of metadata. Thus, a technique advantageously identifies when to temporarily stall the prediction pipeline to access the higher-level structure, thereby avoiding a much longer stall because of a misprediction and restart of the prediction pipeline.

In addition to one or more of the features described above or below, or as an alternative, in further embodiments of the invention, responsive to a given metadata presence information being available, the given metadata presence information is written into the metadata presence table based on an associated instruction line being in an instruction cache. Thus, this advantageously allows the given metadata presence information to be written in the metadata presence table as soon as the instruction cache set predictor information is known.

In addition to one or more of the features described above or below, or as an alternative, in further embodiments of the invention, responsive to a given metadata presence information being available, the given metadata presence information is written into a buffer, it is confirmed that an associated instruction line is in a set predictor table, and the given metadata presence information is written from the buffer into the metadata presence table, responsive to the confirming. Thus, this advantageously allows the given metadata presence information to be written in the metadata presence table as soon as the instruction cache set predictor information is confirmed in the set predictor table.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a block diagram of a metadata predictor process in accordance with one or more embodiments of the present invention;

DETAILED DESCRIPTION

Figure 1:
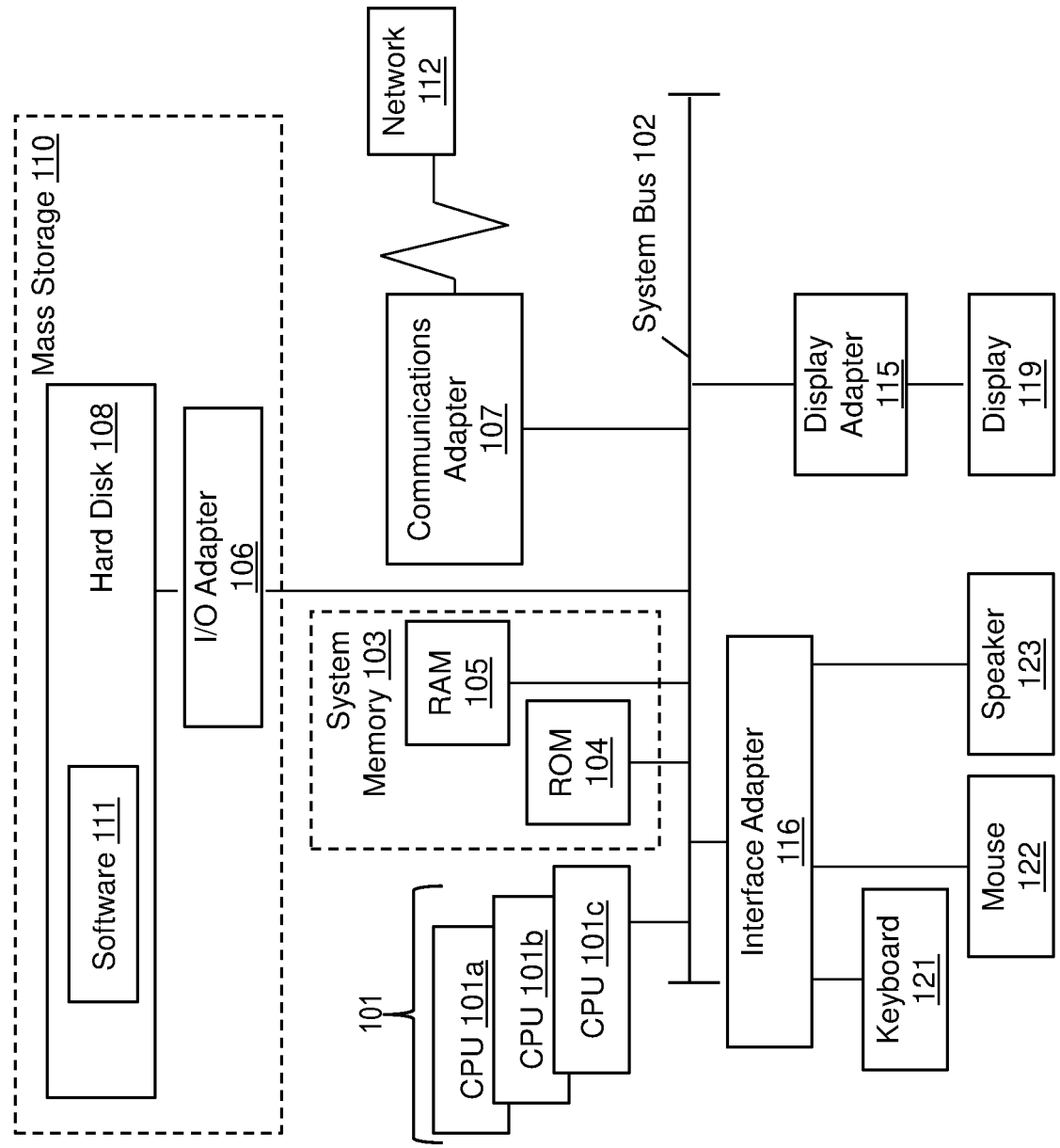
FIG. 1 depicts a block diagram of an example computer system for use in conjunction with one or more embodiments of the present invention.

One or more embodiments of the present invention provide computer-implemented methods, computer systems, and computer program products arranged and configured for using metadata presence information to determine when to access a higher-level metadata table. One or more embodiments utilize branch presence knowledge to more accurately determine if a higher-level metadata table should be accessed, even if a lower-level metadata table encounters a miss. This allows for greater prediction accuracy by utilizing the entire capacity of the branch metadata predictor when really needed. One or more embodiments utilize knowledge of which lines of metadata currently exist in the instruction cache (I-cache). If there is a lower-level table miss on a line of metadata and the line of metadata also does not exist in the instruction cache, then the metadata predictor could afford to go out to the upper-level table since the process and time for going to the upper-level table can effectively hide behind the latency of the instruction cache miss, according to one or more embodiments. If the lower-level table misses on a line of metadata that does exist in the instruction cache, the metadata predictor is configured to determine that it is prudent to access the upper-level table if this access is certain to provide metadata to affect the predictions. In general, it may be better to intentionally stall the branch prediction (and possibly the processor pipeline) temporarily until all the metadata information is known for a searched line of metadata to correctly influence the instruction stream of the processor. The penalty of stalling (e.g., about a few clock cycles) would be less than the penalty of restarting (e.g., about four, five, six, seven or more times the clock cycles for a stall) the processor pipeline on misprediction.

A metadata predictor, sometimes referred to as a branch metadata predictor or branch predictor, is a system that uses metadata to predict information about instructions and/or data in a microprocessor. Load instructions being dependent on store instructions is an example of a type of information that can be predicted in a metadata predictor. A line prefetch predictor is another example. Branch prediction is yet another type of metadata prediction that is a performance-critical component of a pipelined high frequency microprocessor. Branch prediction is used to predict the direction (e.g., taken versus not taken) and the target address of branch instructions. This is beneficial because it allows processing to continue along a branch's predicted path rather than having to wait for the outcome of the branch to be determined. A penalty is incurred only if a branch is mispredicted.

A branch target buffer (BTB) is a structure that stores metadata including branch and target address information. Other structures, such as a branch history table (BHT), pattern history table (PHT), and multiple target table (MTT), can be included in the BTB to store additional information used for branch direction and target prediction. The BTB can be searched in parallel to and independently from instruction fetching to find upcoming branches, in which case BTB is utilized for lookahead branch prediction, which is called asynchronous branch prediction. Additionally, the BTB can be accessed simultaneously with and/or after fetching instructions and used to determine instruction boundaries in order to provide a prediction for each encountered branch instruction, in which case it is called synchronous branch prediction. In either case, the performance benefit of the BTB is a function of the accuracy of the prediction provided from the BTB and the latency required to access the BTB.

Moreover, branch prediction attempts to locate branches in an instruction stream being executed by a processor to avoid costly branch wrong pipeline restart penalties. Modern implementations of processors can predict both the direction and target instruction address (IA) of a branch. One way to predict the direction and target instruction is by using a branch target buffer (BTB), which stores what the target instruction address was for a branch the last time it was encountered. As noted above, some branch metadata predictors utilize multiple levels of branch prediction table hierarchies, such as a first-level BTB1, which is generally smaller and has a faster access time than a second-level BTB2 that can store a much larger number of branches, but generally has a slower access time. This may be analogous to how memory hierarchies like a level 1 (L1) and a level 2 (L2) data or instruction cache may be designed.

Knowing when to go out to a higher cache level is generally compulsory, for example, such as when the desired data or instruction text does not exist in a lower level of the memory hierarchy. Therefore, the next level in the hierarchy is accessed. For branch prediction tables like a BTB, the absence of a branch in a lower-level hierarchy table does not necessarily mean the branch will reside in an upper level of the hierarchy; the branch may not exist in the address space. Simply going out to upper hierarchy branch prediction tables every time there is a lower level miss can thus be detrimental to performance of the processor. The branch prediction pipeline could stall, waiting for the upper level to be searched, resulting in a stall further down the processor's pipeline. If the processor's pipeline does not stall, branches that should have had a branch prediction applied to them but did not result in a surprise branch restart in the processor's pipeline. Unnecessary transfers from the higher-level tables could also displace more valuable branch metadata information in the lower-level tables. Having better knowledge of when a higher-level branch prediction table should be searched is advantageous for maximizing performance of a processor, as disclosed in accordance with one or more embodiments. According to one or more embodiments, the metadata predictor incorporates metadata presence information with data information. For example, for a given address space, metadata predictor determines if branches are known to exist there or not. With each line stored in the instruction cache, the metadata predictor maintains information as to where the branch prediction logic (BPL) knows branches to exist. Branch prediction logic is stalled (only) if there is information that indicates it may be more beneficial to access the BTB2. Accordingly, one or more embodiments provide the ability to exploit the entire capacity of the metadata predictor hierarchy (e.g., BTB1 and BTB2) when beneficial.

Various terms may be utilized herein:
LIB is the line index buffer. LOB is the line output buffer. BTB is the branch target buffer. IL is the intraline branch which is a branch whose target is in the same line of instruction text (itext). DGT refers to dynamically guessed taken branch. Exit branch refers to a taken branch that takes the flow from line X to some other line. Entry point is the instruction address (IA) where the metadata predictor starts searching after finding an exit branch, thereby effectively being the exit branch's target instruction address. Taken branch offset is the number of lines between the entry point and the exit branch. SKOOT denotes the Skip Over Offset, which indicates a number of lines that contain no branches starting from the entry point, and thus need not be searched.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
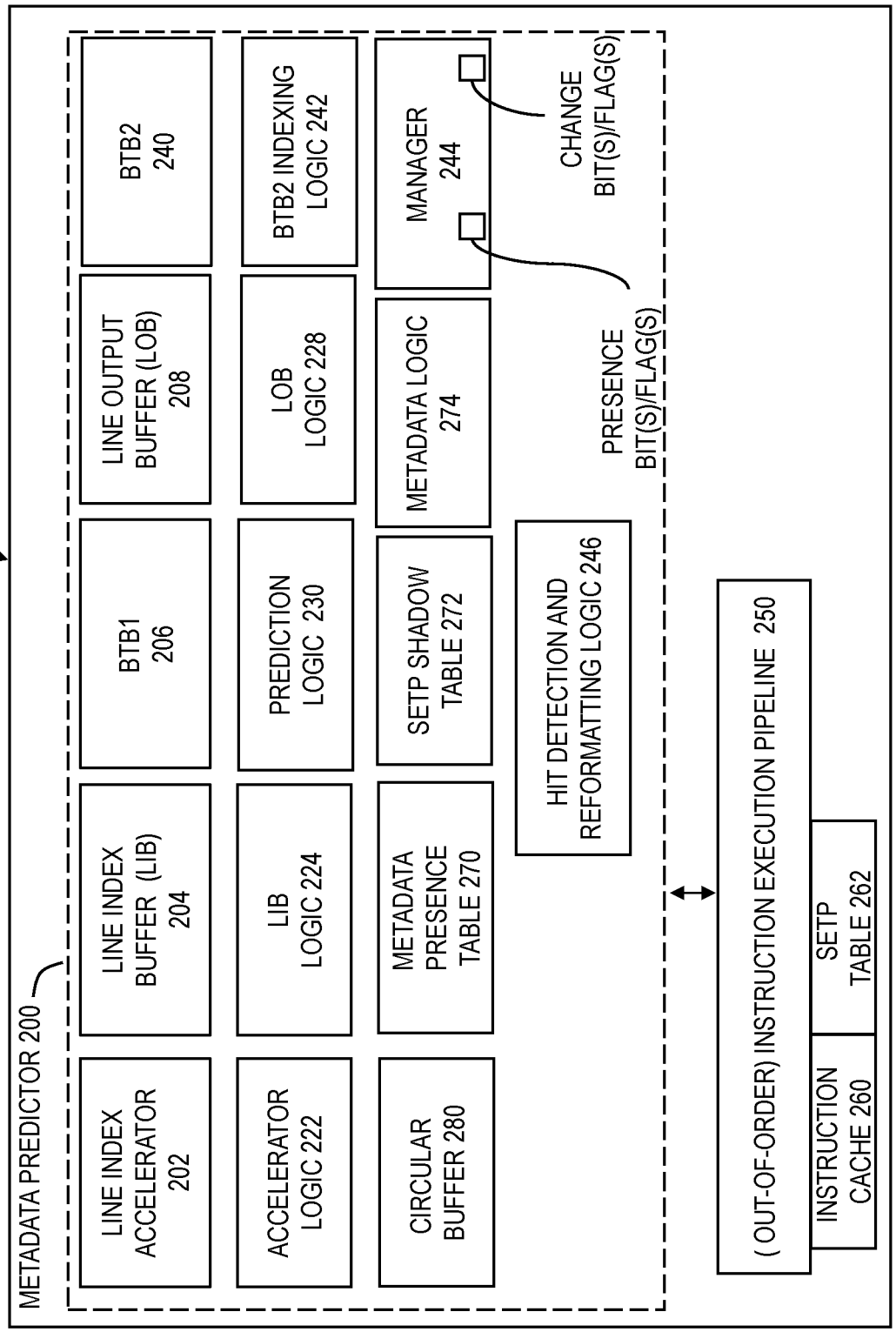
FIG. 2 depicts a block diagram of a metadata predictor in a processor in accordance with one or more embodiments of the present invention.

FIG. 2 is a block diagram of an integrated semi-inclusive hierarchical metadata predictor 200 in processor 101 according to one or more embodiments of the inventions. Processor 101 could be representative of any of the processors 101 discussed in computer system 100 in FIG. 1. Additionally, functions of processor 101 can be used and/or implemented in hardware components of hardware and software layer 60 depicted in FIG. 30. Metadata predictor 200 is outside of and runs asynchronously to an instruction execution pipeline 250. Instruction execution pipeline 250 can be an out-of-order pipeline and includes modules/blocks to operate as part of the processor core as understood by one of ordinary skill in the art. Metadata predictor 200 is configured to communicate with (e.g., send and receive data) from instruction execution pipeline 250. Instruction execution pipeline 250 can be any instruction pipeline. In an example instruction execution pipeline 250, of the several units that comprise the processor core, branch prediction logic has the responsibility of the instruction fetch and branch prediction in an instruction fetch and branch prediction unit (IFB). The IFB is the core's navigator, arbitrating all pipeline restart points for both threads. Furthermore, the IFB guides the instruction cache and merge (ICM) unit, is responsible for fetching instruction text from the level 1 instruction cache (e.g., instruction cache 260 coupled to set predictor (setp)

table 262), and is responsible for attempting to ensure that only the instruction text on what it believes the correct speculative code path is delivered to the instruction decode and dispatch unit (IDU). The pipeline then dispatches to the instruction sequence unit (ISU) which maintains the out-of-order execution pipeline. Instruction issue queues are used to execute instructions in fixed-point units (FXU), vector and floating point units (VFU), load-store units (LSU), etc. Address translation is performed by the translator unit (XU), and checkpointing is managed by the recovery unit (RU). Once an instruction is decoded to be a branch, the dynamically predicted information of that branch overrides any instruction text based static guess that the IDU would normally apply.

Metadata predictor 200 includes various hardware components including line index accelerator 202, line index buffer (LIB) 204, branch target buffer (BTB1) 206, line output buffer (LOB) 208, accelerator logic 222, LIB logic 224, LOB logic 228, prediction logic 230, BTB2 240 (which is larger than BTB1 and can supply metadata to BTB1), BTB2 indexing logic 242, semi-inclusive manager 244, hit detection and reformatting logic 246, (branch) metadata presence table 270, set predictor shadow table 272, metadata logic 274, and circular buffer 280; the hardware components include caches, combinational logic, memory, etc. Further, the various hardware components of metadata predictor 200 may include firmware (as computer-executable instructions) executed on microcontrollers, along with hardware modules, as special-purpose hardware (e.g., application specific hardware, application specific integrated circuits (ASICs), as embedded controllers, hardwired circuitry, etc.), and/or as some combination or combinations of these. In examples, the modules described herein can be a combination of hardware and programming. The programming can be processor executable instructions stored on a tangible memory, and the hardware can include processing circuitry for executing those instructions. Alternatively or additionally, the modules can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. Further, the modules of metadata predictor 200 can include various digital logic circuits to function as discussed herein.

Figure 3:
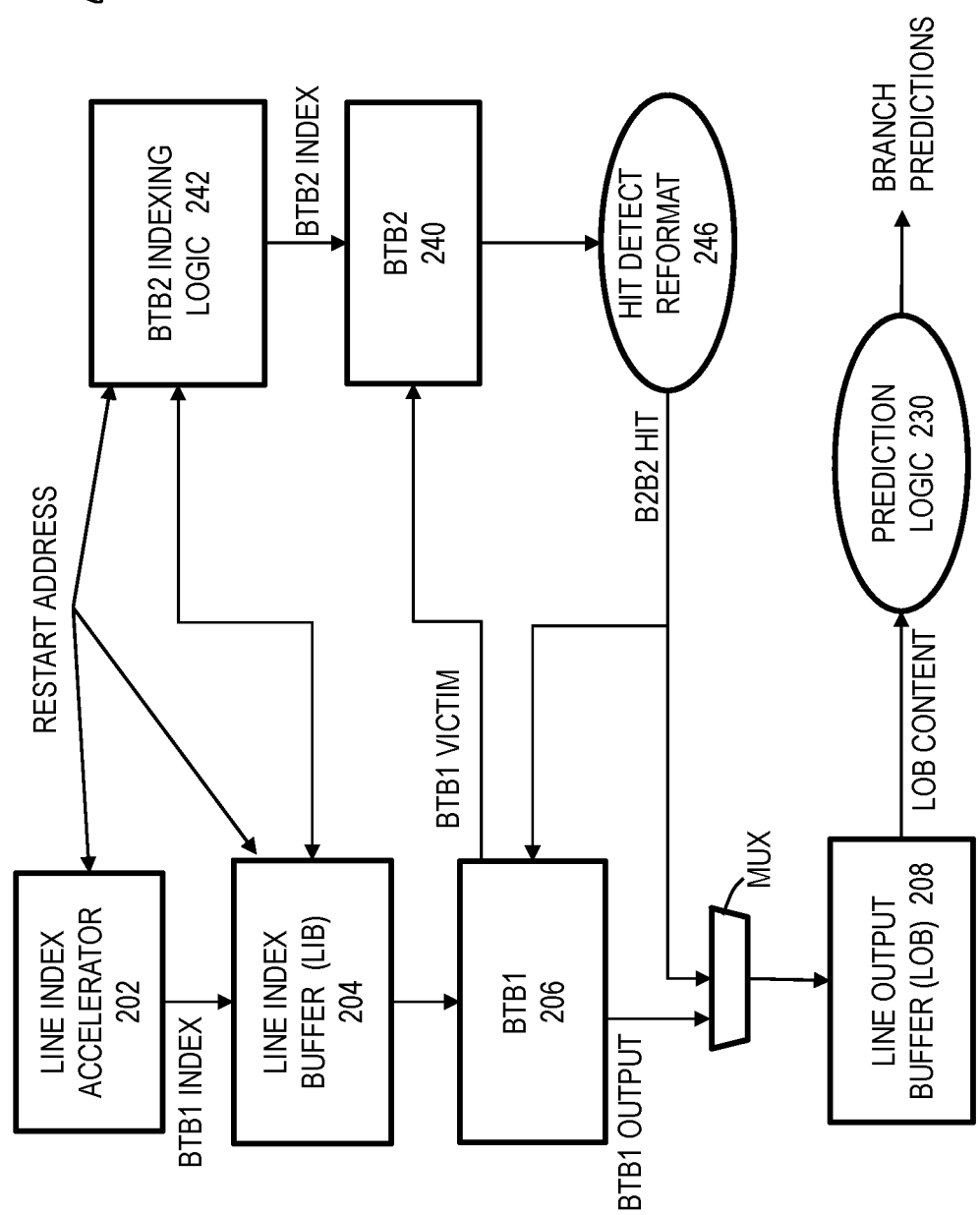
FIG. 3 depicts a block diagram a metadata predictor with a metadata prediction cache in accordance with one or more embodiments of the present invention.
Figure 4:
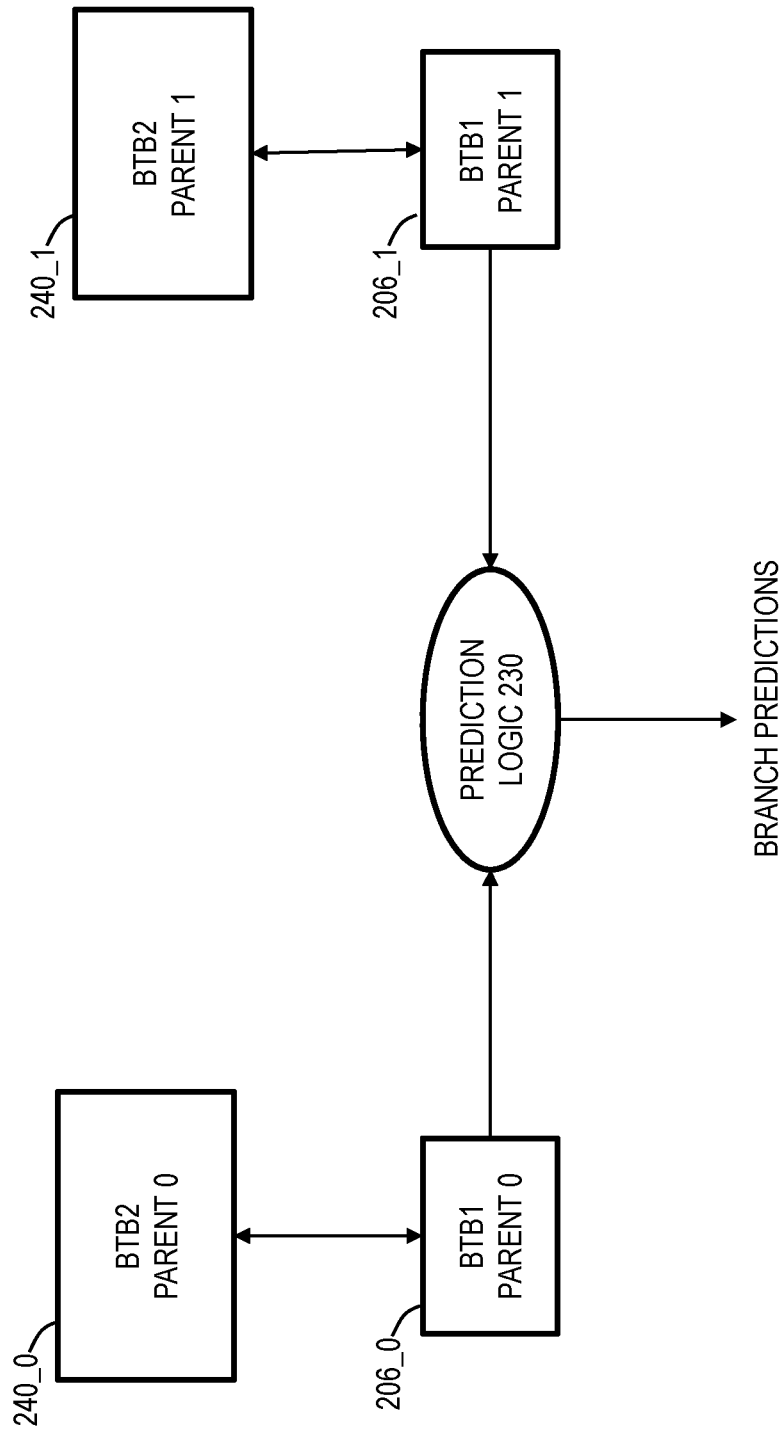
FIG. 4 depicts a block diagram of a metadata predictor in a parent-based design in accordance with one or more embodiments of the present invention.

FIG. 3 is a block diagram of integrated semi-inclusive hierarchical metadata predictor 200 with a prediction cache in accordance with one or more embodiments of the present invention. FIG. 4 is a block diagram of integrated semi-inclusive hierarchical metadata predictor 200 with a prediction cache parent-based design in accordance with one or more embodiments of the present invention. BTB1 206 can be broken into sections for use, for example, four sections. Similarly, BTB2 240 can be broken into sections dedicated with one dedicated to a section in BTB1 206. More particularly, BTB1 206 is operated as multiple sections in the parent-based design of FIG. 4, although BTB1 206 is a memory structure. In FIG. 4, BTB1 206 is represented by two sections which depict BTB1 206 utilized as BTB1 206_0 and BTB1_1 for parent 0 and 1, respectively. Accordingly, BTB2 240 is represented by two sections which depict BTB2 240 utilized as BTB2 240_0, BTB2 240_1 for parents 0 and 1, respectively. Each section can have its own LOB 208 (not shown in FIG. 4) between the BTB1 and prediction logic 230 in the parent-based design of FIG. 4. Multiplexers (not shown in FIG. 4) may be utilized to provide the appropriate line of metadata to prediction logic 230 based on a predetermined manner of selection.

In FIGS. 3 and 4, BTB1 206 is read out on a line basis, and output is written into a prediction cache, such as LOB 208, to be reused while staying within that line. An index pipeline (e.g., index pipeline 552 depicted in FIG. 5) is configured for reading BTB1 206 and sending output into LOB 208. A prediction pipeline (e.g., prediction pipeline 554 depicted in FIG. 5) is configured for using BTB data from BTB1 206 (including BTB1 206_0 and B2B1_1) and LOB data from LOB 208 to make predictions via prediction logic 230 of processor 101. In metadata predictor 200, index and prediction pipelines 552 and 554 are decoupled and operate independently of each other, in addition to operating asynchronously to instruction execution pipeline 250. Further, it should be appreciated that a second-level hierarchical predictor (e.g., BTB2) is incorporated into the index pipeline of the metadata predictor with the prediction cache (e.g., LOB 208). Although the predictors are described as branch target buffers (BTBs such as BTB1 and BTB2) which are a type of branch predictor, one or more embodiments are applicable to other types of predictors.

Branch prediction latency can be a source of performance issues for any processor; the downstream pipeline must accurately fetch instruction text as quickly as possible to maintain a low cycle per instruction (CPI). Accurate branch predictions allow for such fetching. However, if no prediction is available, the processor could: continue ahead and risk a branch wrong penalty for fetching the wrong instruction text or wait for a new branch prediction to become available, thus increasing CPI. According to one or more embodiments, buffering in LIB 204 and LOB 208 and reuse of prediction metadata in LOB 208 allow for low latency branch predictions, thereby keeping instruction fetching ahead of instruction execution, as well as providing power saving benefits. The decoupling of the index and prediction pipelines 552, 554 allows the index pipeline 552 to get ahead of the prediction pipeline 554, which can hide other prediction latency inducing events (e.g., read/write collisions, etc.). Further, the index pipeline 552 is to be read ahead of prediction pipeline 554 in order to allow the prediction pipeline 554 to generate predictions as quickly as possible.

As seen in FIG. 3, LIB 204 is filled with line addresses in the sequence it believes they will be encountered in the program. LIB 204 and BTB2 indexing logic 242 are populated from restarts, which can be external to the prediction logic coming from the processor pipeline or internal to the prediction logic coming from prediction pipeline 554. LIB 204 is also populated with sequential addresses and can be populated with a predicted sequence of lines from a line index accelerator 202, which is discussed further herein.

In metadata predictor 200 with a prediction cache (e.g., LOB 208), BTB1 206 is read on a line basis and output is written into a prediction cache to be reused while staying within that line. The index pipeline is for reading BTB1 206 and putting its output into the prediction cache which is LOB 208. The output of LOB 208 is fed into the prediction pipeline (including prediction logic 230) which makes the actual predictions and determines if the next set of predictions is to be made from within the same current line and/or in a different line and whether or not that next line is already in LOB 208 or is different from what the LOB contains.

Figure 7:
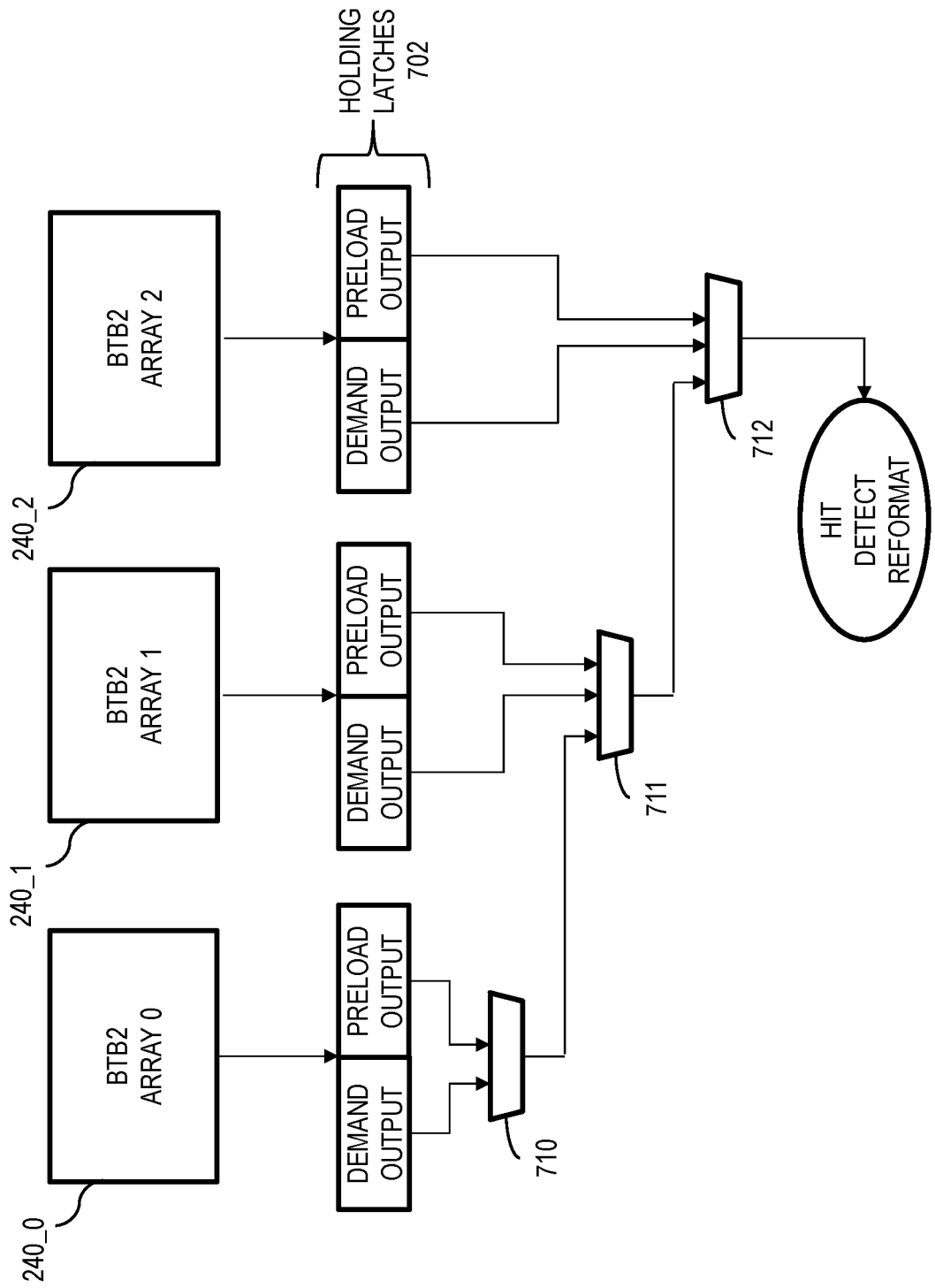
FIG. 7 depicts a block diagram illustrating data return with distributed multiplexing and page mode in accordance with one or more embodiments of the present invention.

BTB2 indexing logic 242 is logic configured for indexing (i.e., querying) BTB2 240. The output of BTB2 240 is a line of metadata that is passed to hit detection and reformatting logic 246. Hit detection and reformatting logic 246 is configured to convert the line of metadata from the BTB2 format into the BTB1 format that can be stored as a line of metadata in BTB1 and well as to be stored in LOB 208. A multiplexer (mux) is configured to select between BTB2 hit data (i.e., line of metadata) and BTB1 output (i.e., line of metadata) for storage into the BTB prediction cache (e.g., LOB 208) in the index pipeline. In addition to going into the LOB this also could be bypassed into the prediction pipeline 554. Upon writing new lines of metadata into BTB1 206 from BTB2 240 (e.g., after reformatting by hit detection and reformatting logic 246), semi-inclusive manager 244 is configured to cause victims to be written and/or write victims into BTB2 240, where the victims are one or more lines of metadata previously stored in BTB1 206 prior to writing the new lines in BTB1 206. The BTB1 victims are the cast out entries upon writing the BTB1 206 with new line content from surprise installs and/or BTB2 hits. BTB1 surprise install victims require reading BTB1 206 before performing a new install. The reading of BTB1 206 can be staged through the processor pipeline and/or re-read at the time frame of performing the install. The BTB1 demand victims are naturally read from the index pipeline 552. The BTB1 preload victims require reading the BTB1 206 while performing the BTB2 read process. When accessing the BTB2 240, BTB2 indexing logic 242 is configured to search BTB2 240 for the line of metadata that is missing (demand) from BTB1 206 and for lines nearby (preload) (as depicted in FIG. 7). Various algorithms including heuristics can be used to determine which lines to preload. One approach may be to search for lines in the same page, although other approaches are possible. In one or more embodiments, the preload data can have the same granularity as the demand data and/or a larger granularity than the demand data. Preload lines might be sequential and needed soon in prediction pipeline 554. In one or more embodiments, the BTB1 206 can be read to output any preload victim lines in order to write the BTB1 preload victim lines into the BTB2 240, because the BTB1 preload victim lines which are associated with and/or related to the BTB1 demand victim line. The demand victim line can be determined using any known technique, such as first-in first-out (FIFO), least recently used (LRU), oldest, etc.

Semi-inclusive manager 244 is configured to write the victim lines of metadata from BTB1 206 to BTB2 240 under various conditions, such as if the victims are not already in BTB2 240 and/or if BTB2 240 does not contain the updated content for the victim lines of metadata where the update occurred in BTB1 206. Semi-inclusive manager 244 can utilize different techniques to manage this hierarchy. In one or more embodiments, semi-inclusive manager 244 can store a change bit and/or flag anytime content is updated for a line of metadata in BTB1 206. Each line of metadata in BTB1 206 has a one-to-one relationship to its own change bit/flag where, for example, a "1" bit and/or flag "on" in the change bit field denotes that content is updated, while a "0" bit and/or flag "off" denotes that the content has not changed. In one or more embodiments, semi-inclusive manager 244 can store a BTB2 presence bit and/or flag which denotes whether a line of metadata in BTB1 206 is also present in BTB2 240. In other words, the BTB2 presence bit/flag tells semi-inclusive manager 244 whether BTB2 240 has a line of metadata corresponding to the same line of metadata in BTB1 206. Each line of metadata in BTB1 206 has a one-to-one relationship to its own presence bit/flag where, for example, a "1" bit and/or flag "on" in the BTB2 presence bit/flag field denotes that line of metadata is present in BTB2 240, while a "0" bit and/or flag "off" denotes that the line of metadata is absent from BTB2 240. The change bit/flag field and the BTB2 presence bit/flag field can be stored in semi-inclusive manager 244, BTB1 206, and/or in another memory structure, such that each line of metadata has its own dedicated change bit/flag field and the BTB2 presence bit/flag field. Because BTB1 206 has a limited capacity, a line of metadata is to be evicted as the victim line when a new line of metadata is to be written to BTB1 206, for example, as a policy.

A few example scenarios are discussed for explanation purposes and not limitation. When there is a hit in BTB2 240 using the index from BTB2 indexing logic 242, semi-inclusive manager 244 is utilized to bring the output line of metadata into BTB1 206; when semi-inclusive manager 244 determines that a victim line of metadata currently stored in BTB1 206 has been changed (i.e., updated) in the change bit/flag field, semi-inclusive manager 244 is configured to cause the changed line of metadata (e.g., BTB1 victim in FIG. 3) to be stored in BTB2 240 and then subsequently removed from BTB1 206. Correspondingly, the output line of metadata (i.e., BTB2 hit data) from BTB2 240 is stored in BTB1 206, thereby directly making use of the metadata information brought in from the second-level structure (i.e., BTB2 240). There can be various reasons in which the victim line of metadata has been changed in BTB1 206. In one example, there can be one or more branches in the victim line of metadata that have changed from taken to not taken or vice versa. Also, there can be one or more branches in the victim line of metadata that have changed their respective target addresses. It is noted that the victim line of metadata includes multiple branches, and the update/change could have occurred for any one of the branches.

When there is a hit in BTB2 240 using the index from BTB2 indexing logic 242, semi-inclusive manager 244 is utilized to bring the output line of metadata into BTB1 206; when semi-inclusive manager 244 determines that the victim line of metadata currently stored in BTB1 206 is absent from BTB2 240 using the presence bit/flag field, semi-inclusive manager 244 is configured to cause the (absent) line of metadata (e.g., BTB1 victim in FIG. 3) to be stored in BTB2 240 and then subsequently removed from BTB1 206. Similarly, the output line of metadata (i.e., BTB2 hit data) from BTB2 240 is stored in BTB1 206, thereby directly making use of the metadata information brought in from the second-level structure (i.e., BTB2 240).

Although both the change bit/flag and the presence bit/flag can be utilized for each of line of metadata in BTB1 206, one or more embodiments may just use the change bit/flag without using the presence bit/flag because semi-inclusive manager 244 can be configured set to the change bit/flag to "1" or "on" for lines of metadata that are absent in BTB2 240 of the second level and when any entry in the line of metadata has been updated in BTB1 206. In this case, the change bit/flag can represent a combined changed in the first level compared to the second level and/or the line of metadata not being in the second level. However, benefits of storing this information separately (e.g., having a separate change bit/flag and presence bit/flag) are that the semi-inclusive manager 244 can also store location information about where in BTB2 240 the entry is located in order to encourage putting it back in the same place it came from when possible.

Figure 8:
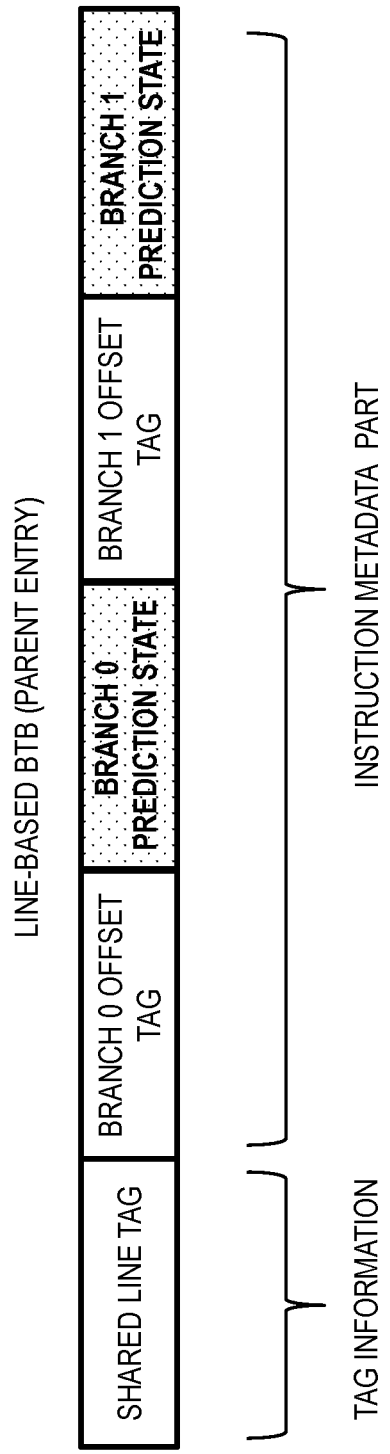
FIG. 8 depicts a block diagram of an example line of metadata in accordance with one or more embodiments of the present invention.

Further regarding a hit whether in BTB1 206 using an index from LIB 204 and/or in BTB2 240 using BTB2 indexing logic 242, FIG. 8 illustrates an example line of metadata. In the example line of metadata depicted in FIG. 8, the line-based entry contains multiple branches in the same line in which the branches are tracked together and share the line tag. The branch prediction state includes the target address that the corresponding branch instruction is to take. The branch prediction state can be updated, and accordingly, semi-inclusive manager 244 is configured to set the change bit/flag to "1" or "on" when the branch prediction state for at least one branch in the line of metadata has changed.

With regard to the index or index line used to query BTB1 206 and/or BTB2 240, there is an instruction metadata part which is an index into the structures and part of which is used as tag information. The index determines which row/entry of the table is read out in BTB1 and/or BTB2. The content contains state such as validity bits and tag bits. A hit (e.g., match) is determined based on the entry being set as valid and tag bits in the entry of in BTB1 and/or BTB2 matching tag bits of the search address in the index.

A miss can be a partial miss and/or a full miss. A full miss is when the BTB (which could be BTB1 and/or BTB2) does not contain any of the index information (e.g., tag bits) in the line of metadata. For example, none of the branch instructions being searched for are present in the BTB (which could be BTB1 and/or BTB2); accordingly, this may be considered a full miss. A partial miss is when the BTB (which could be BTB1 and/or BTB2) contains part of but not all of the index information (e.g., part of the tag bits) in the line of metadata. For example, the line of metadata may contain information for one or more branch instructions but fails to contain information for one or more other branch instructions being queried by the index. The process of searching BTB2 240 at the second level (e.g., to determine a hit) is triggered by a miss in BTB1 206 at the first level. Accordingly, the line of metadata being brought in from BTB2 240 and stored in BTB1 206 corresponds to a previous search and miss of that line at BTB1 206, and the line of metadata was found in BTB2 240. Although an example partial miss and full miss have been discussed for explanation purposes, it should be appreciated that additional implementations can be utilized.

To further illustrate details of index pipeline 552 and prediction pipeline 554, FIG. 5 depicts a metadata prediction cache process 500 for metadata predictor 200 in accordance with one or more embodiments. The metadata prediction cache process 500 is a computer-implemented process implemented by processor 101 in FIGS. 1, 2, 3, and 4, along with other figures discussed herein. The description of the metadata prediction cache process 500 shown in FIG. 5 is provided with reference, where appropriate, to FIGS. 1, 2, 3, and 4.

At block 502 of the index pipeline 552, metadata predictor 200 is configured to populate LIB 204. LIB 204 can be populated with a reset instruction address from instruction execution pipeline 250 and/or prediction logic 230. Additionally, LIB 204 can be populated by an accelerator instruction address. The accelerator instruction address can be sent to LIB 204 from line index accelerator 202. More regarding line index accelerator 202 is discussed further herein. LIB 204 is a first in first out buffer (FIFO). The reset instruction is used to provide an index and/or index line in LIB 204, and the index line is stored and eventually utilized to search and/or query BTB1 206. The index and/or index line in LIB 204 refers to a subset of instruction address bits that are used by LIB 204 to access BTB1 206. In one or more embodiments, each entry in BTB1 206 may represent a 128 byte (B) line; based on the size of the BTB1, an index/index line in LIB 204 can use a subset of instruction address bits (e.g., a subset of the 128B line), such as instruction address bits (48:56) which refer to instruction address bits 48-56 of the instruction address that is utilized to read BTB1 206. In one or more embodiments, the index/index line in LIB 204 can be any predefined subset of instruction address bit, and 128B is illustrated for example purposes. Accordingly, an index line of LIB 204 is utilized to query BTB1 206. Further, an instruction execution pipeline event of the instruction execution pipeline 250, such as a branch wrong, can restart index pipeline 552, prediction pipeline 554, and line index accelerator 202.

At block 504, metadata predictor 200 (e.g., using LIB logic 224) is configured read out LIB 204, thereby causing indices with instruction addresses to be read out from LIB 204. LIB 204 may read out an index for an instruction address at a time.

At block 506, metadata predictor 200 (e.g., using LIB logic 224) is configured to check if the received instruction address is valid or not. Metadata predictor 200 (e.g., using LIB logic 224) is configured to check if an actual instruction address is read out from LIB 204 or whether the output is empty. Each instruction address may be read out one at a time (e.g., serially) as an entry in a line (e.g., cache line), and/or as a group/block of entries. If ("NO") the instruction address is empty, flow returns to block 504 and metadata predictor 200 (e.g., using LIB logic 224) is configured to read LIB 204 which should have been populated with indices. If "YES" the instruction address is valid (i.e., present), flow proceeds to block 508. Also, if "YES" the instruction address is valid (i.e., present), metadata predictor 200 (e.g., using LIB logic 224) is configured to check if this is the last entry of LIB 204 at block 510. For example, metadata predictor 200 can check if there is or is not another valid line address in the LIB. If this is not ("NO") the last entry in the current line, metadata predictor 200 (e.g., using LIB logic 224) is configured to read out the next entry in the current line by returning to block 504. If ("YES") this is the last entry in the current line of LIB 204, metadata predictor 200 (e.g., using LIB logic 224) is configured to generate line X+1 by proceeding to the next consecutive line after the current line (e.g., line X), for querying the LIB 204 at block 512, and flow returns to block 504. Metadata predictor 200 writes line X+1 to the tail of the LIB, and once it has finished processing line X on the 'valid' path, metadata predictor 200 will process line X+1. For example, line X+1 refers to the next consecutive 128B line of instruction text after line X.

At block 508, metadata predictor 200 is configured to index BTB1 206 by sending a list of indices (e.g., search tag) from LIB 204 to access and query BTB1 206. Each index (e.g., search tag) of the indices is utilized for reading out BTB1 206. Although not shown, various queues can be utilized in index pipeline 552 and prediction pipeline 554 for holding data when applicable. As a branch target buffer, BTB1 206 contains and tracks branches that have been guessed taken (and/or resolved taken) and not taken, along with their target. BTB1 206 is a large array and/or cache that contains metadata about branch details. BTB1 206 holds instruction address bits as tags in preparation for search.

At block 514, metadata predictor 200 is configured to check for a hit in BTB1 206. If there is not ("NO") a hit, flow returns to block 504 and flow proceeds to block 516 to search for the same line of metadata in BTB2 240. If "YES" there is a hit, flow proceeds to block 520. The tags (for example) in the BTB1 are compared with the current search tag in the index. If they match, then the line of metadata read from the BTB1 will be used as an input to the prediction pipeline 554. If the tag in BTB1 does not match current search tag, then the line is not used for prediction. In one or more embodiments, whether or not there is a hit does not influence flow, and metadata predictor 200 can write the metadata to the LOB regardless of the hit. Accordingly, the "No" path could be modified based on the implementation, and one implementation may choose to drop that metadata, since it cannot be used for prediction.

At block 520 of the prediction pipeline 554, metadata predictor 200 (e.g., using LOB logic 228) is configured to populate LOB 208 with data from BTB1 206. It is noted that LIB 204 and LOB 208 are smaller in size and capacity than BTB1 206. LOB 208 is populated with data from the cache hits of BTB1 206. Just as BTB1 206, LOB 208 stores branch and target address information, including locations, directions, and targets. It should be appreciated that, although BTB1 and LOB can be utilized for branch predictions, they can be utilized with any metadata for any purpose.

At block 522, metadata predictor 200 (e.g., using LOB logic 228) is configured to read out the line (e.g., cache line) in LOB 208. For example, an index/index line from LIB 204 is used to read the line of metadata from BTB1 206. In one or more embodiments, the output of LOB 208 is the line of branch prediction metadata associated with the 128B line of instruction text that has been search for by the index from LIB 204.

At block 524, metadata predictor 200 (e.g., using LOB logic 228) is configured to check if anything was read out (e.g., was a line of metadata for an instruction address read out) for the line of LOB 208. If data was not read out ("NO") for the cache line (i.e., empty), flow returns to block 522. If "YES" data (e.g., line of metadata for the instruction address) was read out, metadata predictor 200 (e.g., using LOB logic 228) is configured to generate the prediction and send the prediction (e.g., target address) downstream at block 526. For example, the predicted target address is sent to the instruction cache and merger (ICM) unit and the instruction decode and dispatch unit (IDU) of instruction execution pipeline 250 for processing. Additionally, at block 528, metadata predictor 200 (e.g., using LOB logic 228) is configured to check if the predicted target address in the line of metadata is intraline. When the predicted target address is intraline, this means that the predicted target address is in the same/current line of metadata for the instruction text that was read out of LOB 208. If "YES" the predicted target address is in the current line read out from LOB 208, at block 530, metadata predictor 200 (e.g., using LOB logic 228) is configured to update the entry instruction address and output the updated the entry instruction address (which is the next target address on the same line) to be used to generate another prediction without requiring another line be read from LOB 208; flow returns to block 530. Update the entry instruction address refers to which branches will be considered next for prediction. Continuing the example of using 128B lines, assume the first search of this line was at byte 20 of that 128B line. This means, if there are branches in bytes 0 to 19, metadata predictor 200 is not interested in those branches because processing has already branched beyond that instruction text. An intraline branch may take metadata predictor 200 right back to byte 20 (e.g., in the case of a small loop), but it could possibly take processing to a different byte. If the target of the intraline branch were to take processing to byte 10 instead of byte 20, then metadata predictor 200 would have to consider any branches in bytes 10 to 19, even though metadata predictor 200 did not on the last prediction. So, effectively, the search start position is being moved based on the intraline target. Blocks 526, 528, and 530 can continue executing loop 550 in the prediction pipeline 554 that generates new predictions using the current line with an updated instruction address (i.e., updated target address), thereby making metadata predictor 200 faster by not having to read out another/subsequent line (or entry).

If the predicted target address is not intraline ("NO"), metadata predictor 200 (e.g., using LOB logic 228) is configured to increment the read pointer at block 532, and flow returns to block 522. This causes LOB 208 to read out the next line. In one or more embodiments, the LOB, like the LIB, can be implemented to be FIFO, while other implementations are possible. So, if metadata predictor 200 determines that there is no intraline branch, this means it is done with this LOB entry and can increment to the next entry in the FIFO.

Figure 6:
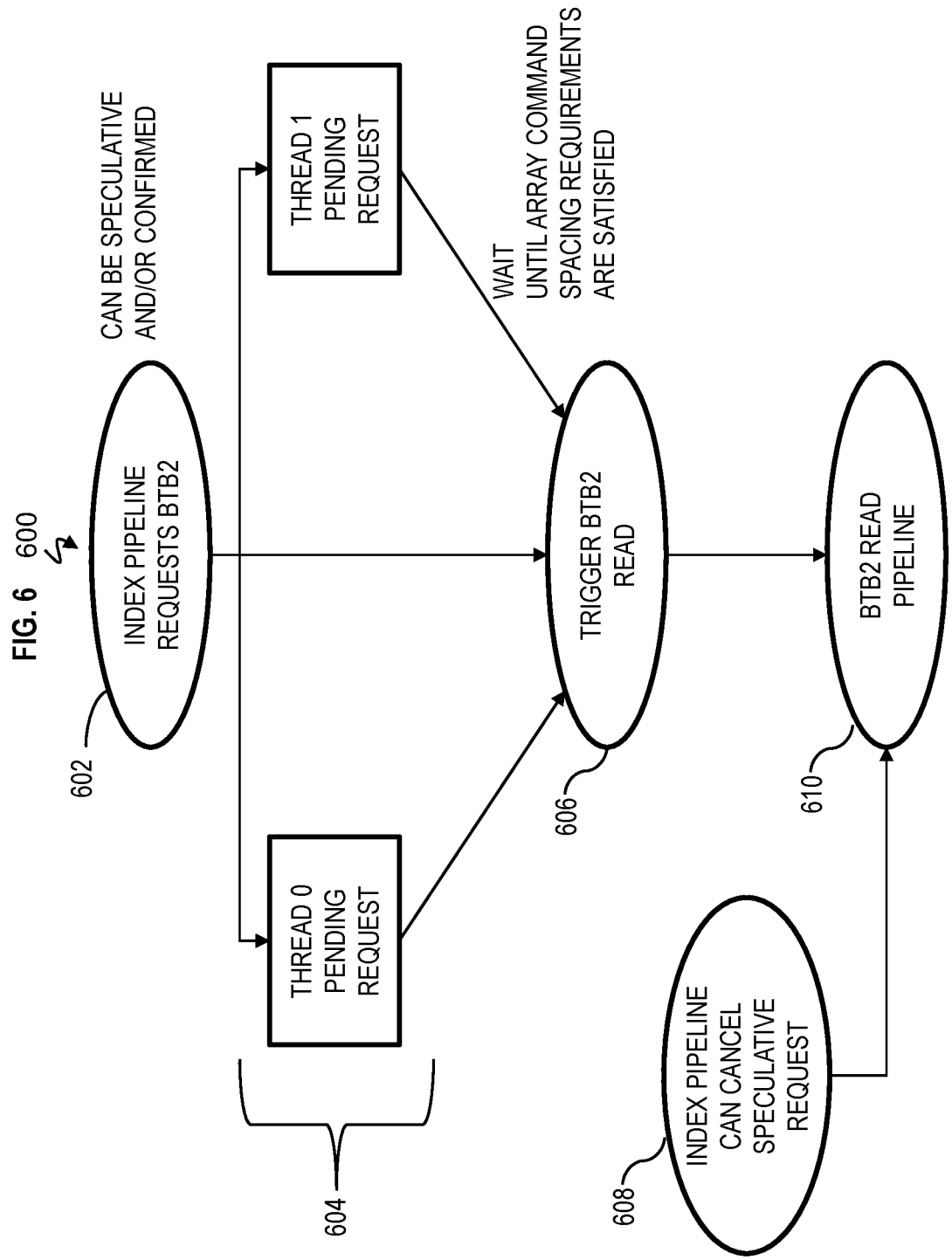
FIG. 6 depicts a block diagram of a flow for triggering second-level reads in accordance with one or more embodiments of the present invention.

FIG. 6 is a block diagram of flowchart 600 for triggering BTB2 reads in accordance with one or more embodiments. As noted herein, a line based hit versus miss means all branches for that line (or part of line with parent-based variable line size) are either in the BTB1 or not. BTB2 indexing logic 242 is triggered by index pipeline 552, for example, when there is miss when indexing BTB2 240. One or more embodiments are able to accommodate different definitions of BTB1 misses. BTB2 indexing logic 242 can be triggered upon not finding content for the line of metadata currently being searched for in BTB1 206. Additionally and/or alternatively, more complex methods can be employed to distinguish cases where content is missing due to capacity limitations of BTB1 206 (e.g., the first-level predictor) from cases where content is missing because there are no relevant types of instructions, for example, no branches, in the section of code being searched.

As seen at block 602 in FIG. 6, index pipeline 552 is configured to initiate a BTB2 search request (as depicted at block 516 in FIG. 5), which can either trigger a BTB2 read immediately and/or be queued and acted upon later. A BTB2 read may have to wait until array command spacing requirements are satisfied. Therefore, each thread in a multithreaded design may queue a pending request and hold that information until the BTB2 pipeline becomes available at block 604. At such a time, the pending request can trigger a BTB2 read at block 606. At block 610, the BTB2 read process includes a pipeline of sending the index to the array(s) of BTB2 240, accessing those arrays, returning the data, hit detection, and muxing of that data into index pipeline 552.

A BTB2 access can be triggered once it is confirmed that there is a BTB1 miss and/or performed to save latency, and the BTB2 access can be triggered speculatively and cancelled if it turns out the speculative access of data was not actually needed at block 608. Speculative BTB2 index could occur upon every BTB1 index of BTB1 206. Additionally, other techniques can be employed to selectively speculate when to read BTB2 240. An example would be to trigger speculative indexing (only) after external restarts. Many other approaches for when to trigger requests speculatively are possible and can be included in one or more embodiments.

FIG. 7 is a block diagram depicting data return with distributed multiplexing/muxing and page mode in accordance with one or more embodiments. The BTB2, or more particularly a parent-based partition of the BTB2, can be composed of multiple separate array instances such as BTB2 240_0, BTB2 240_1, BTB2 240_2 (generally referred to as BTB2 240) in one or more embodiments. BTB2 index bits can select an appropriate instance. Page mode can be employed to share wires for demand and preload data. When accessing an array for BTB2 240, multiple lines of metadata can be read. All lines of metadata may be associated with the same page such as a continuous region of program space.

That region would include one demand line and one more or more preload lines in holding latches 702. The read data would be captured and over time would be returned on the data return multiplexer (mux) (e.g., multiplexers 710, 711, 712, for example, one line at a time. FIG. 7 illustrates one demand line output and one preload line output per array with distributed data return muxing in order to select one of the lines from the selected array. The muxing can pass through the neighboring array output data if it is not the selected array. Other implementations are possible to return preload data without employing page mode, for example, which would require indexing the array repeatedly for all the lines requested. The demand line output refers to the actual line of metadata that has been queried, and preload line output refers to a contiguous line of metadata. For example, the demand line output could be a line of metadata this is 128B, while the contiguous line of metadata is the next adjacent line of 128B.

Figure 9:
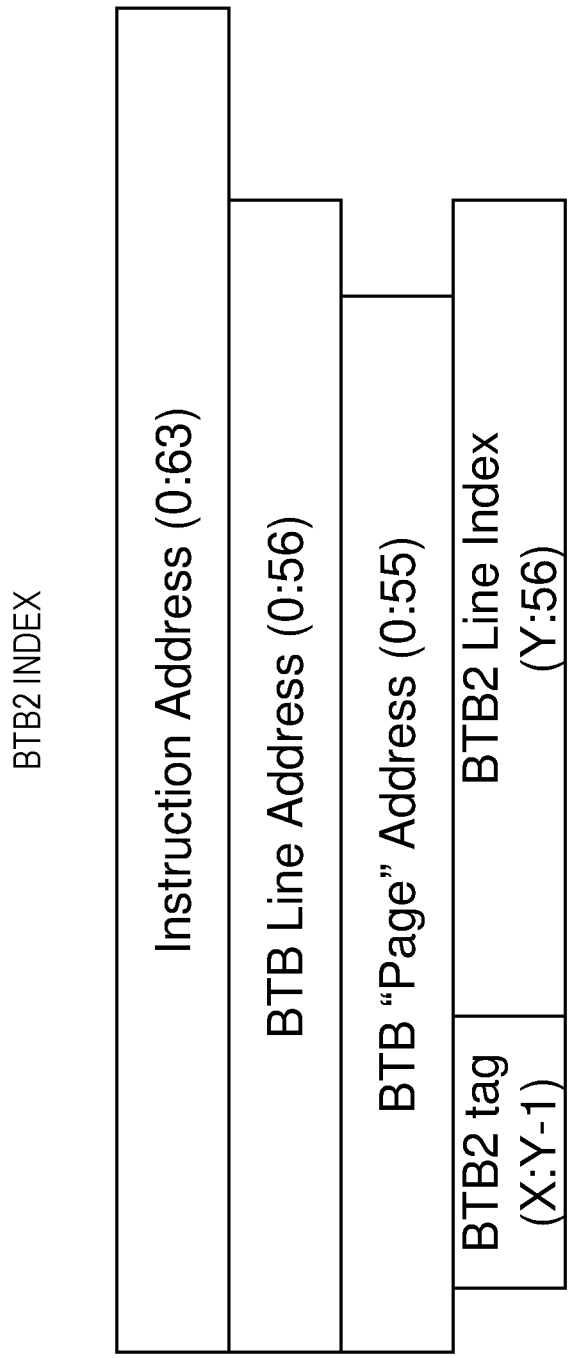
FIG. 9 depicts a block diagram of an example index utilized to query a second-level structure in accordance with one or more embodiments of the present invention.

FIG. 9 is a block diagram of an example BTB2 index used by BTB2 indexing logic to query the BTB2 in accordance with one or more embodiments. An example BTB2 line index can be formed as a subset of an instruction address. Subsets of a 64-bit instruction address can be defined appropriately. For example, with a 128 byte line size, a line address would consist of address bits 0:56 as illustrated in FIG. 9. With a 256 byte page size, a page address would consist of address bits 0:55. Using a 256 byte page size means there are 2 lines (128 bytes each) per page. The BTB2 index bits would be Y:56, and the BTB entries would contain a line tag consisting of bits X:Y−1. As an example scenario, it may be assumed that X=32, Y=44, Y−1=43. These values depend on the size of the BTB2 (e.g., Y:56 are the index and the depth is therefore 2^(56−Y+1) rows). X:Y−1 determines the size of the tag in the BTB2. In one case, X=0 would be a full tag, while X>0 means only a partial tag is stored (e.g., X much greater than could be 32). As an example, 44:56 means a 13 bit index which is 8K=8192 rows. Also, 32:43 for the tag means 12 tag bits in each of the entries. BTB2 index bits would be based on the depth of the structure. For example, a 2048 (2K) line deep structure would require 11 index bits, and therefore would be bits 46:56. Bits to the left of this would be used as line tag bits. The tag could be bits 0:45. Additionally and/or alternately, a partial tag could be maintained such as bits 32:45. More complicated tags and indexing are possible, which could be utilized in one or more embodiments. For example, a more complicated technique could include performing an exclusive-or operation on multiple address bits to form a single index or tag bit. Hit detection consists of comparing the tag read from the array (e.g., BTB2 240) against a search address tag in the index (i.e., query).

Figure 10:
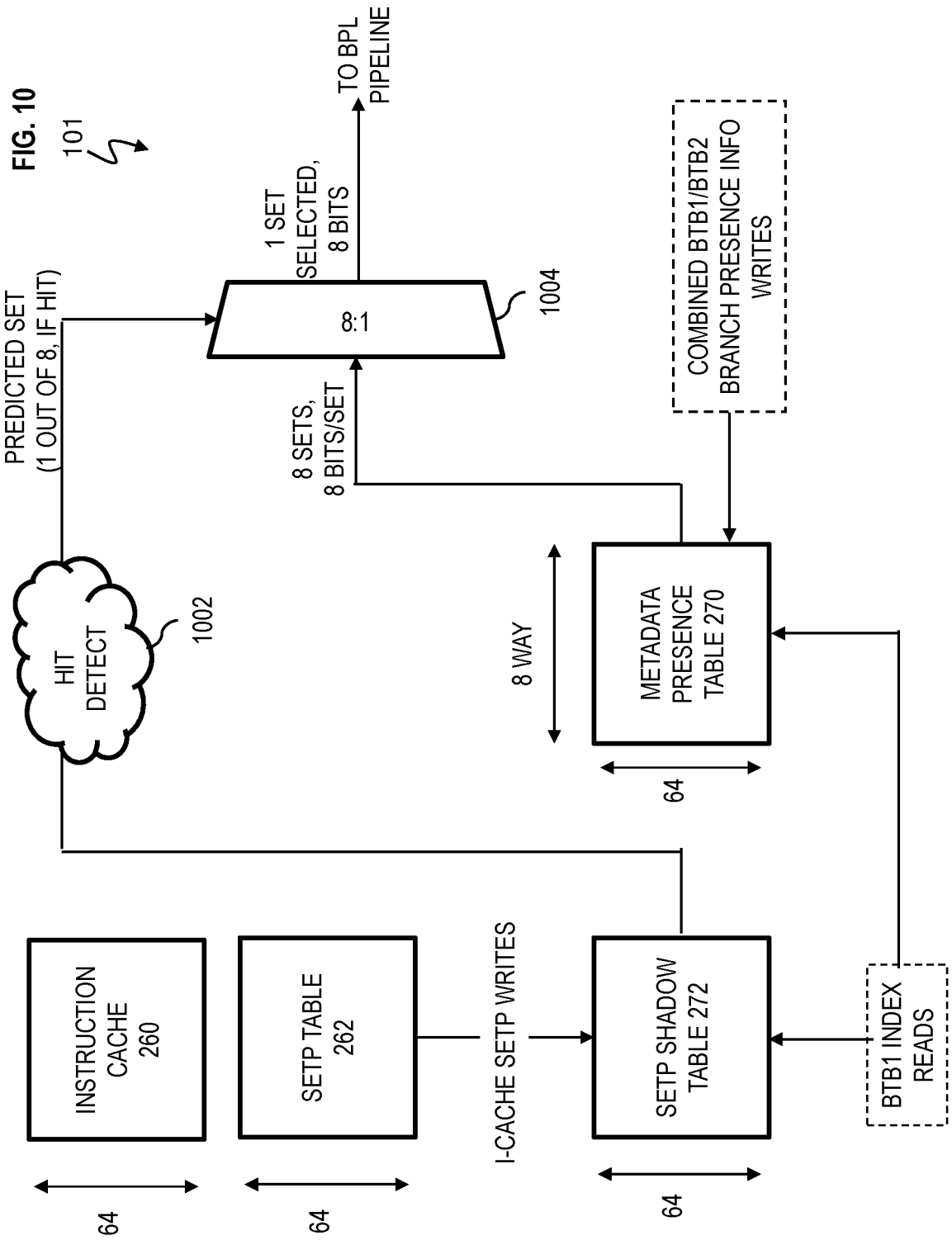
FIG. 10 depicts a block diagram of an aspect of a metadata predictor configured to use metadata presence information to determine when to access a higher-level metadata table in accordance with one or more embodiments of the present invention.

FIG. 10 is a block diagram of an aspect of metadata predictor 200 in processor 101 where metadata predictor 200 is configured to use metadata presence information to determine when to access a higher-level metadata table (e.g., BTB2 240) in accordance with one or more embodiments of the present invention. Although not shown in FIG. 10, metadata predictor 200 of processor 101 uses a two-level branch predictor, which includes a lower level (e.g., BTB1 206) that is directly searched in the main branch prediction logic (BPL) pipeline (e.g., BTB1 206 can be searched in prediction pipeline 554, where block 508 could be performed in prediction pipeline 554) that generates branch predictions that steer the instruction execution pipeline 250; also, the two-level branch predictor of metadata predictor 200 includes an upper level (e.g., BTB2 240) that increases the capacity of the overall BTB hierarchy of the (branch) metadata predictor 200. BTB2 240 is only searched if metadata logic 274 of metadata predictor 200 confirms that not all the components of the line being searched for are wholly contained within the BTB1 206 (aside from speculative indexing of the BTB2 that was mentioned above).

In one or more embodiments, BTB1 206 may be designed to store parts/components of a 128B line in chunks of 32 bytes (e.g., a 128B line is indexed down to address bit 56 in big endian). BTB1 206 and BTB2 240 are tables that indicate which parts/components of the 128B line are contained there within. BTB1 206 and BTB2 240 can indicate they contain the entire 128B line, the 64B even part of the line, the 64B odd part of the line, and/or the four 32B parts of the line. If a search of BTB1 206 (using, for example, LIB 204) hits on metadata whose sum of the line components amounts to the entire 128B line, then there is no reason to access the BTB2; this is because all the line's branch metadata resides wholly in the BTB1 206. If the sum of all the parts/components is less than a 128B line (e.g., the entire line is not in the BTB1 206, and/or only the 64B part of the line hit and nothing else), then metadata predictor 200 is configured to determine if a BTB2 access should occur to search BTB2 240 for the other parts/components of the line (i.e., the missing parts of the line).

With reference to FIG. 10, one or more embodiments are configured and arranged to exploit what is known in a set predictor (setp) table 262. Typically, set predictor table 262 is used to anticipate a set out of a cache (e.g., instruction cache 260) and speculatively multiplex the appropriate set into the instruction execution pipeline 250. In one or more embodiments, instruction cache 260 may be structured as an 8-way set associative, 64 row array, although other structures may be utilized. Set predictor table 262 is also 64 rows but contains information for each row about which of the 8 sets should be speculatively selected. Set predictor table 262 is accessed at the same time as instruction cache 260. The output of set predictor table 262 is then used to multiplex (mux) the output of instruction cache 260 into the instruction text parsing part (IDU) of processor 101. While this is done speculatively, instruction cache 260 performs hit detect to confirm if the correct set was selected. If set predictor table 262 was correct, the latency of the hit detect was removed from the instruction execution pipeline 250. If incorrect, the incorrect, speculative instruction text must be rescinded, and the correct instruction text is sent into the next processor stage of instruction execution pipeline 250.

Figure 11:
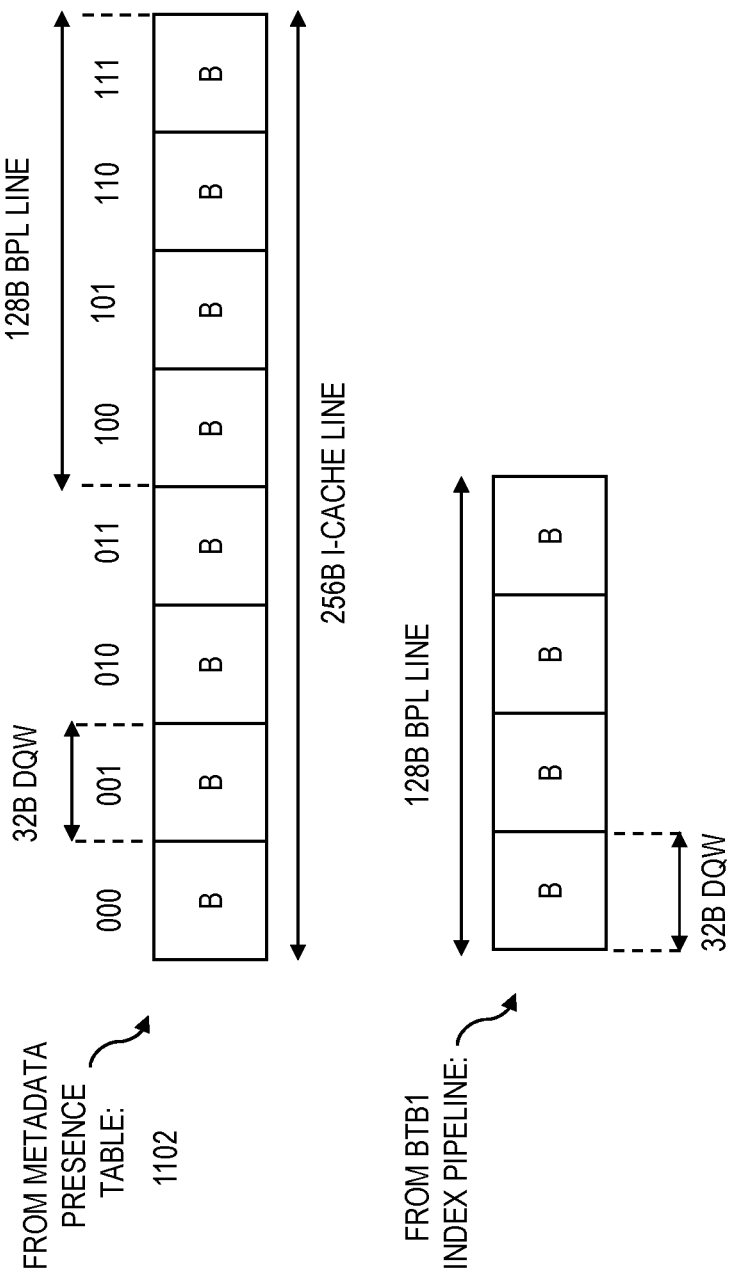
FIG. 11 depicts a block diagram of metadata presence information in metadata presence table vector and metadata presence information in a first-level structure vector in accordance with one or more embodiments of the present invention.

According to one or more embodiments, metadata predictor 200 includes a set predictor shadow table 272 that shadows/copies information contained in set predictor table 262. Set predictor shadow table 272 is also 64 rows and contains information for each row indicating which of the 8 sets should be speculatively selected. Set predictor shadow table 272 is written to each time set predictor table 262 is written to. Although set predictor shadow table 272 acts as a proxy for set predictor table 262, in one or more embodiments, set predictor shadow table 272 can be optionally omitted and set predictor table 262 can be accessed directly. Also, metadata predictor 200 is configured and arranged to exploit set predictor shadow table 272 by indirectly using the same information contained in set predictor table 262 in order to correctly access a (branch) metadata presence table 270 (which can be a register file) that indicates, for each line in instruction cache 260 and thus set predictor table 262, which 32B parts of the line are known by BTB1 206 and/or BTB2 240. Metadata presence table 270 is also 64 rows deep, and each row contains 8 sets of 8 bits each. Each of the 8 bits represents branch presence in, for example, an 8 bit vector 1102 as depicted in FIG. 11. If each line is 256B, then 8 bits can be used to represent the eight, double quad word (DQW) components of the line. Each of the double quad word (DQW) components represents 32 bytes, as depicted in FIG. 11. A zero (0) in a bit position indicates that there are no branches in that 32B part of the line; a one (1) in a bit position indicates that there is at least one branch the metadata predictor 200 is aware of in that 32B part of the line.

Both set predictor shadow table 272 and (branch) metadata presence table 270 are accessed simultaneously using the (same) BTB1 index that was used to read out BTB1 206. Similar to how set predictor table 262 speculatively selects one of the instruction cache's eight sets, multiplexer 1004 selects one of the eight sets of eight bits from (branch) metadata presence table 270, after hit detect (at block 1002) is performed on the content in set predictor shadow table 272.

If set predictor shadow table 272 hits (at block 1002) after being queried with the BTB1 index, the metadata presence information such as, for example, branch presence information, for the line of metadata is presented to (branch) prediction logic 230. Metadata logic 274 of metadata predictor 200 may be utilized to determine when the set predictor shadow table 272 hits on the BTB1 index, and further to update the metadata presence table 270. If the sum of all the storage parts/components in the output (i.e., metadata presence information) of set predictor shadow table 272 equates to hitting on the entire line of metadata, then metadata predictor 200 is configured to determine that no prediction pipeline stall is needed and that no BTB2 240 access is needed. The sum of all the storage parts/components in the output (i.e., metadata presence information) of set predictor shadow table 272 equates to hitting on the entire line of metadata when set predictor shadow table 272, for example, outputs metadata information for one 128B part of the line of metadata, outputs metadata information for a 64B even part and 64B odd part of the line of metadata, etc. If the sum of the BTB1 components output from BTB1 206 is less than 128B (after being queried with the BTB1 index), but the portions covered in the BTB1 206 are also indicated as matched to the branches from the (branch) metadata presence table 270, then metadata predictor 200 is configured to determine that no stall of prediction pipeline 554 is needed and no BTB2 access of BTB2 240 is needed either; this is because the metadata predictor 200 maintains knowledge in the (branch) metadata presence table 270 of where the branches are within the line of metadata for metadata hierarchy (e.g., BTB1 206 and BTB2 240).

If set predictor shadow table 272 misses (at block 1002) after being queried with the BTB1 index, this means that the line of metadata does not exist in instruction cache 260. The next level instruction cache (for example, L2 instruction cache (not shown) coupled to instruction execution pipeline 250) is thus accessed. As such, the (branch) metadata presence table 270 is unable to provide information to metadata predictor 200 indicating where the branches are within the line of metadata. If the BTB1 206 hits on the entire line of metadata within the BTB1 206, metadata predictor 200 (using metadata logic 274) is configured to determine that there is no need to access BTB2 240, despite the instruction cache miss in set predictor shadow table 272 representing lines in instruction cache 260. However, if less than the line of metadata is hit in BTB1 206 after being queried with the BTB1 index, metadata predictor 200 is configured to stall the prediction pipeline 554 and access BTB2 240 in order to determine what, if any metadata exists in the line of metadata for BTB2 240. When the BTB2 access of BTB2 240 is completed (after being queried with the BTB1 index), metadata predictor 200 knows where it has knowledge of the branches within the desired line since metadata predictor 200 has searched all of its tables (e.g., BTB1 206 and BTB2 240) and knows at this time where all the metadata should reside in the line. The (branch) metadata presence table 270 is updated to indicate the current state of the metadata predictor's knowledge of branch presence for the line.

Figure 12:
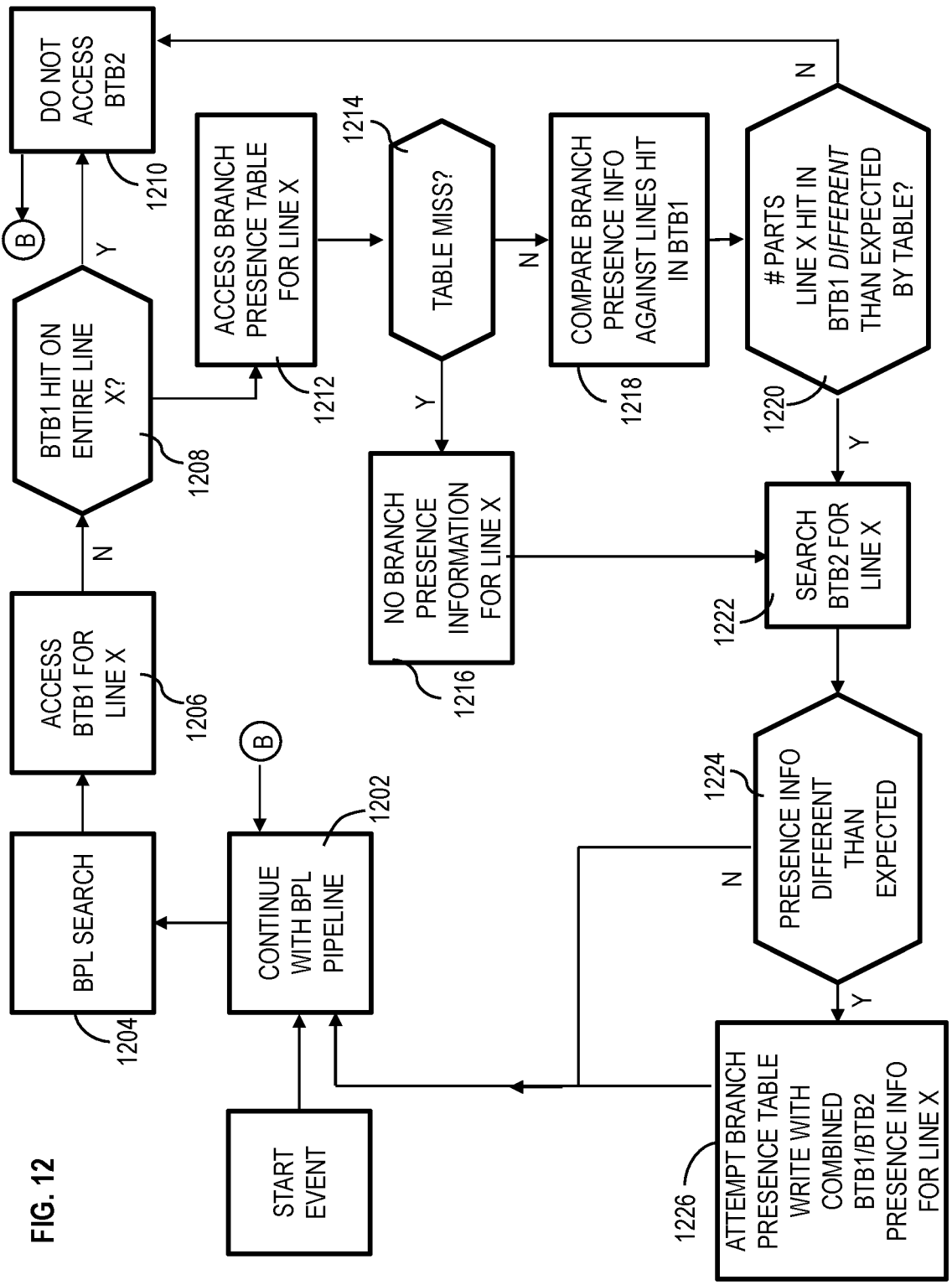
FIG. 12 is a flowchart of a computer-implemented process for obtaining metadata presence information for a line of metadata and/or determining when to access the second-level structure in accordance with one or more embodiments of the present invention.

FIG. 12 is a flowchart of a process 1200 of obtaining metadata presence information for a line of metadata and/or determining when to access the second-level structure (e.g., BTB2 240) for the metadata predictor 200 in accordance with one or more embodiments. Metadata predictor 200 may utilize metadata logic 274 to perform one or more operations in process 1200 along with any other logic circuits.

Figure 13:
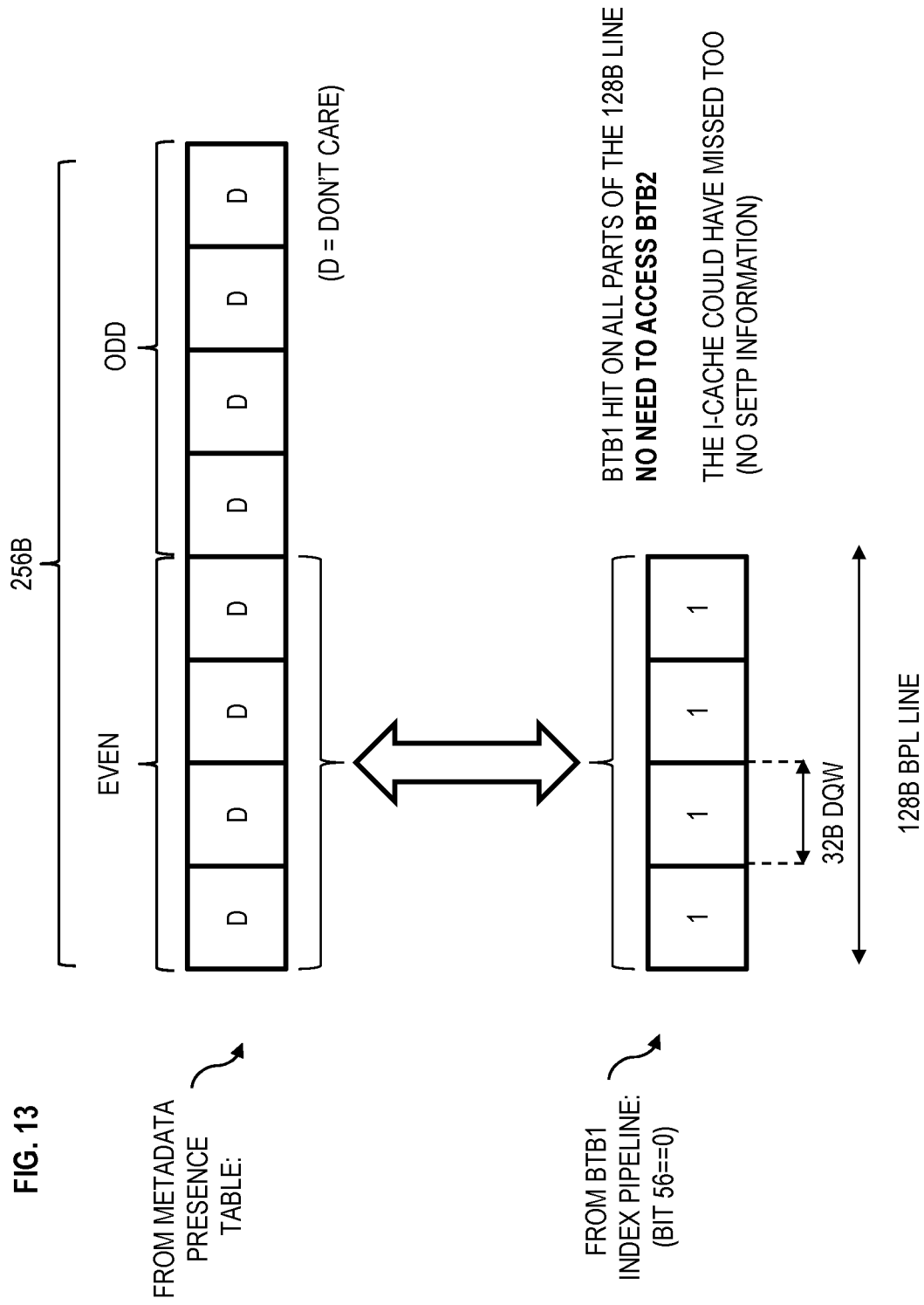
FIG. 13 depicts a block diagram of metadata presence information in a metadata presence table vector and in a first-level structure vector in accordance with one or more embodiments of the present invention.

At block 1202 of the process 1200, metadata predictor 200 is configured to operate index pipeline 552 and prediction pipeline 554. At blocks 1204 and 1206, metadata predictor 200 is configured to perform a branch prediction search which is utilized to index and access BTB1 206 for a line of metadata, such as, for example, line X. At block 1208, metadata predictor 200 is configured to check if there is a BTB1 hit on the entire line X. If ("Yes") there is a hit on the entire line X in BTB1 206 such that BTB1 206 has branch presence information for the entire line X, metadata predictor 200 does not access BTB2 240 and the output from BTB1 206 is provided to prediction pipeline 554 at block 1210. For example, FIG. 13 illustrates that BTB1 206 from index pipeline 552 contains branch presence information for the entire line X. Particularly, metadata predictor 200 has determined that the BTB1 vector from BTB1 206 has confirmed hits (e.g., "1") in all four 32 bit double quad words, which means that BTB1 hit on all parts/components of the 128B line and no comparison is needed with the (branch) metadata table vector. Accordingly, metadata predictor 200 does not care (e.g., represented as don't care "D" in FIG. 13) about the values indicating branch presence for line X in (branch) metadata table vector from metadata presence table 270. Further, the set predictor shadow table 272 could have missed too which means the line X is not in instruction cache 260, which does not matter in this scenario, because the BTB1 vector from BTB1 206 contains the value of all ones (e.g., 1's) denoting branch presence for each part/component in FIG. 13.

With reference to FIG. 12, on the other hand, if ("No") there is not a hit on the entire line X in BTB1 206 such that BTB1 206 does not have presence information for the entire line X, metadata predictor 200 is configured to access (branch) metadata presence table 270 for the line of metadata, for example, line X at block 1212. At block 1214, metadata predictor 200 is configured to check whether there is a miss (or hit) at metadata presence table 270. If ("Yes") there is a table miss, metadata predictor 200 is configured to determine there is no branch presence information for line X in metadata presence table 270 at block 1216 and flow proceeds to block 1222.

Figure 14:
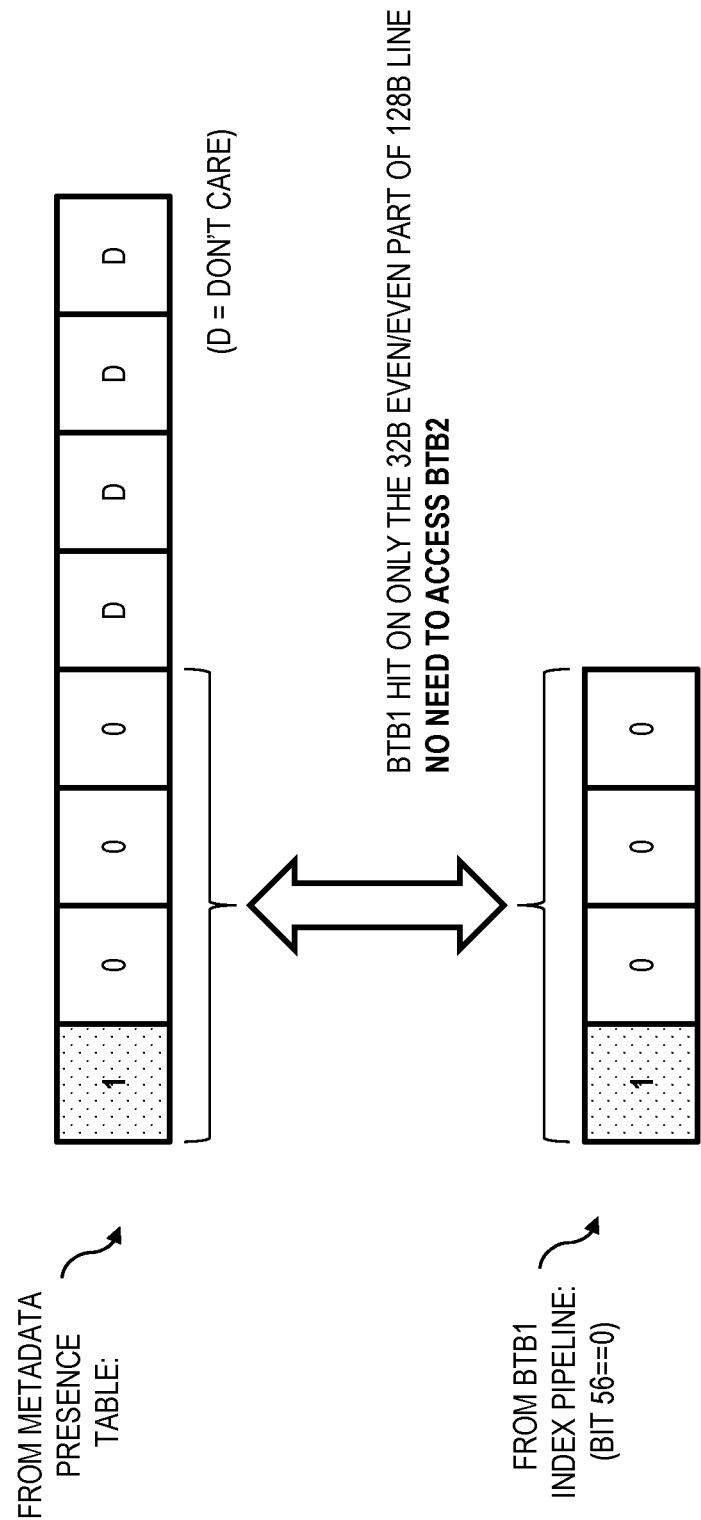
FIG. 14 depicts a block diagram of metadata presence information in a metadata presence table vector and in a first-level structure vector in accordance with one or more embodiments of the present invention.

If ("No") there is not a table miss after querying with the BTB1 index (i.e., there is a hit), metadata predictor 200 is configured to compare the branch presence information in the output metadata table vector to the branch presence information in the BTB1 presence vector at block 1218, and metadata predictor 200 is configured to check which parts/component of line X hit/miss in BTB1 206 that are different than expected from metadata presence table 270 at block 1220. If ("Yes") BTB1 presence vector and metadata table vector both hit on the same parts of line X, metadata predictor 200 determines not to access BTB2 240 because BTB1 206 and BTB2 240 contain the same branch presence information for line X. For example, FIG. 14 illustrates that BTB1 206 from index pipeline 552 contains branch presence information for line X in the BTB1 presence vector while the metadata table vector contains presence information from metadata presence table 270. In this example of FIG. 14, the BTB1 vector has confirmed hits (e.g., "1") in the first 32 bit double quad word and metadata table vector correspondingly has branch presence information in the first 32 bit double quad word from metadata presence table 270 (i.e., the two vectors have matching branch presence information denoted by both having the value "1" in the first part/component and "0" in the second, third, and fourth parts/components). Based on this comparison, metadata predictor 200 determines that no access of BTB2 240 is needed because both BTB1 206 and BTB2 240 contain the same branch presence information. The comparison is for the first through fourth parts/components (first 128B) between the BTB1 vector and the metadata table vector, and "D" for don't care is shown for the last 128B in the metadata table vector.

Figure 15:
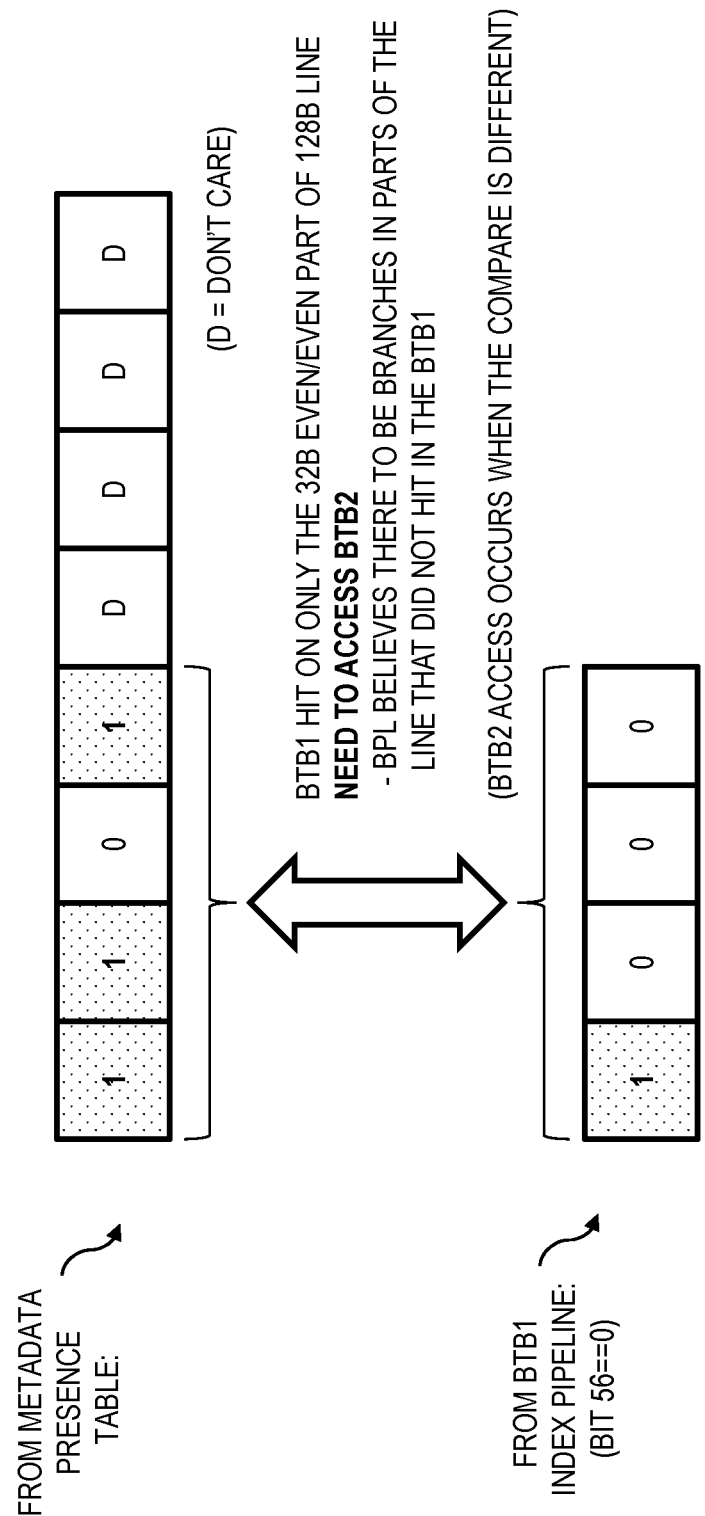
FIG. 15 depicts a block diagram of metadata presence information in a metadata presence table vector and in a first-level structure vector in accordance with one or more embodiments of the present invention.

Referring back to FIG. 12, on the other hand, if ("No") BTB1 presence vector and metadata table vector do not hit on the same parts of line X, metadata predictor 200 is configured to search BTB2 240 for line X using the BTB1 index at block 1222. For example, FIG. 15 illustrates that BTB1 206 from index pipeline 552 contains branch presence information for line X in BTB1 presence vector while metadata table vector contains presence information from metadata presence table 270. In this example in FIG. 15, the BTB1 vector has a confirmed hit (e.g., "1") in the first 32 bit double quad word and metadata table vector from metadata presence table 270 correspondingly has presence information in the first 32 bit double quad word but also has branch presence information in the second and third 32 bit double quad words. In this case, metadata predictor 200 determines that the comparison is different and determines that there are branches in parts/components of line X that did not hit in BTB1 206. Based on this comparison, metadata predictor 200 determines that BTB2 240 is to be searched for line X.

Figure 16:
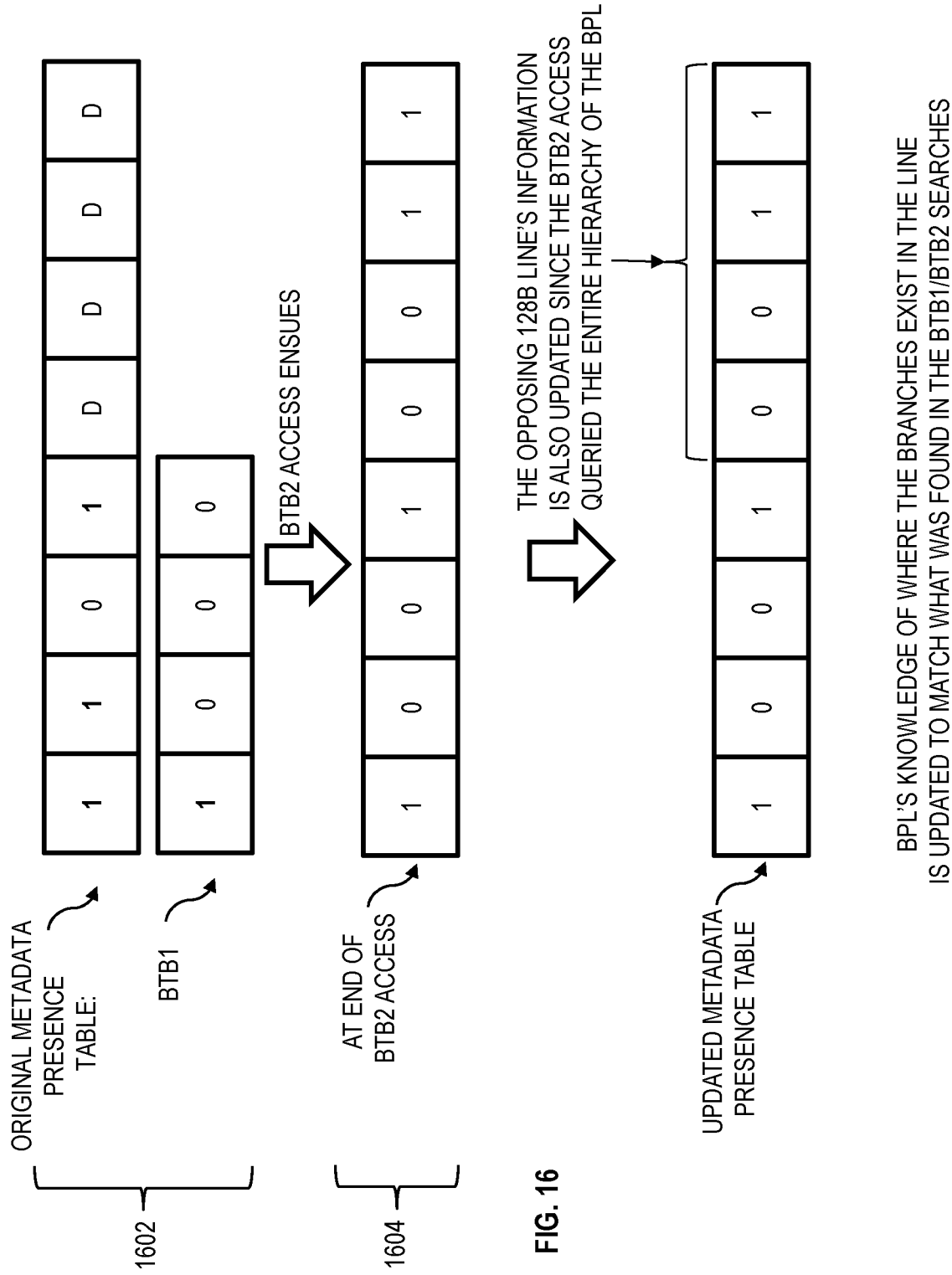
FIG. 16 depicts a block diagram of metadata presence information being updated in a metadata presence table in accordance with one or more embodiments of the present invention.

At block 1224, metadata predictor 200 is configured to check if the branch presence information in BTB2 240 is actually different from the branch presence information in (branch) metadata presence table 270. If ("Yes") the branch presence information in BTB2 240 is different from the branch presence information in (branch) metadata presence table 270, metadata predictor 200 is configured to perform a (branch) metadata presence table write to metadata presence table 270 with the combined branch presence information of BTB1 206 and BTB2 240 for line X at block 1226. For example, FIG. 16 illustrates that the branch presence information in the BTB1 presence vector and the original metadata table vector are different in view 1602 (e.g., as depicted at block 1218). View 1604 illustrates values of the BTB2 branch presence information output from BTB2 240 (e.g., as depicted at block 1222). After a comparison, metadata predictor 200 determines that the second part/component of the BTB2 branch presence information has the value "0" (as well as BTB1 presence vector) which is different from the original metadata table vector, and metadata predictor 200 is configured to update the metadata presence table 270 for line X accordingly to reflect the branch presence information in vectors from BTB1 206 and BTB2 240. Otherwise, if no difference at block 1224, flow returns to block 1202.

Figure 17:
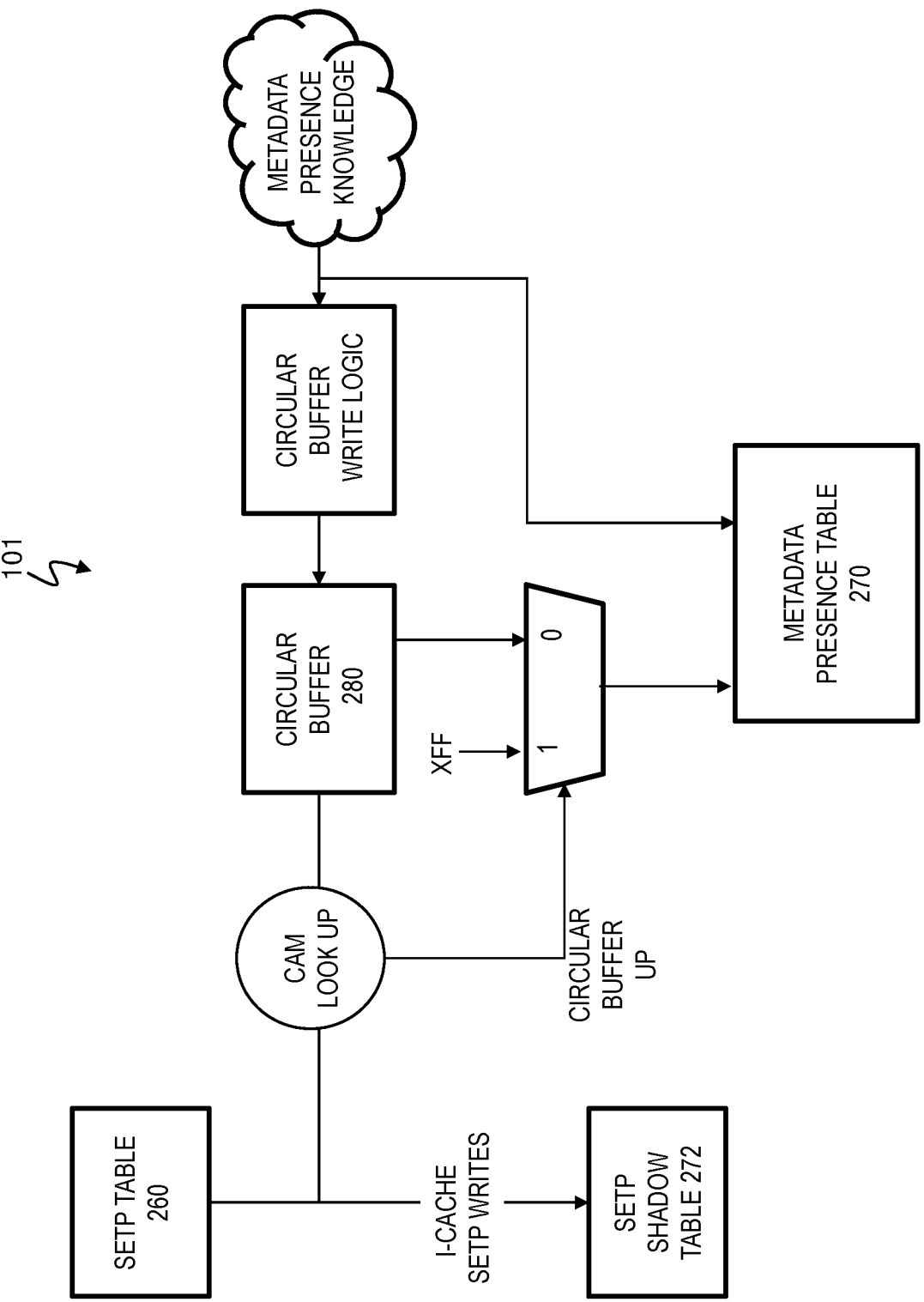
FIG. 17 depicts a block diagram of an example update architecture in a processor which can be utilized to update a metadata presence table in accordance with one or more embodiments of the present invention.
Figure 18:
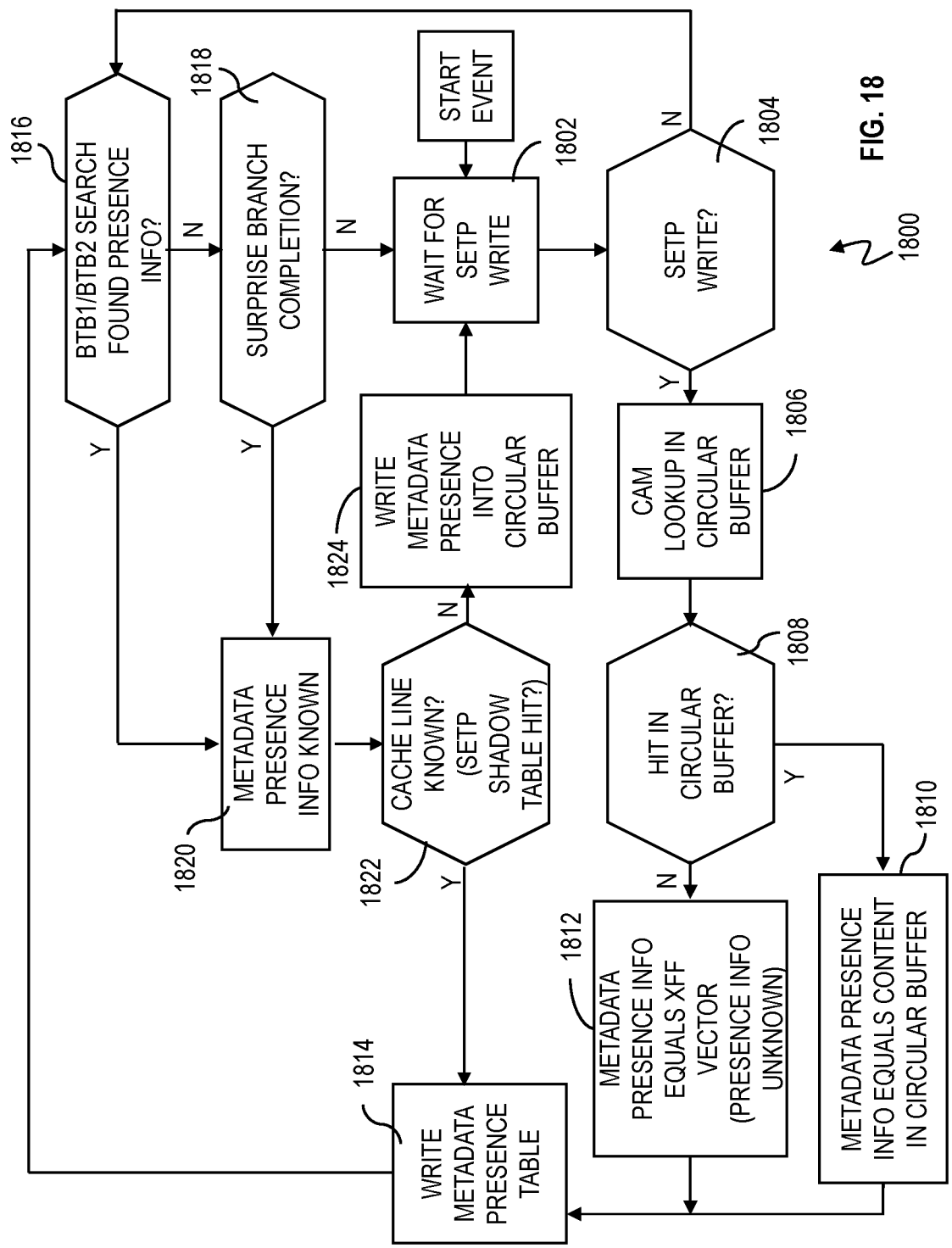
FIG. 18 is a flowchart of computer-implemented update process for updating/writing metadata presence information in metadata presence table in accordance with one or more embodiments of the present invention.

FIG. 17 illustrates an example update architecture in processor 101 which can be utilized to update (branch) metadata presence table 270 in accordance with one or more embodiments. It should be appreciated that certain elements of processor 101 are omitted for the sake of clarity. FIG. 18 is a flowchart of an update process 1800 for updating/writing (branch) metadata presence information in metadata presence table 270 in accordance with one or more embodiments. The update process 1800 in FIG. 18 will be discussed with reference to FIG. 17. Metadata predictor 200 of processor 101 may utilize metadata logic 274 along with any other digital logic circuitry to perform update process 1800.

At block 1802 of the update process 1800, metadata predictor 200 is configured to wait for a set predictor table write to set predictor table 262. The set predictor table write means that a new instruction cache line is being written into instruction cache 260, and set predictor table 262 is written with which set to select for the instruction cache line. Metadata presence table 270 contains the branch presence information organized in the same number of ways/sets. Set predictor table 262 is used to determine which of the 8 sets in metadata presence table 270 to select. Concurrently, because of this event (e.g., operating as a trigger), metadata predictor 200 is configured to write branch presence information for the same cache line, for example, line X, in set predictor shadow table 272. At block 1804, metadata predictor 200 checks that the set predictor table write occurred. If not, flow proceeds to block 1816. If ("Yes"), metadata predictor 200 is configured to perform a circular buffer lookup in circular buffer 280 and check if there is a hit for line X in circular buffer 280 at block 1806, 1808. A circular buffer, circular queue, cyclic buffer, or ring buffer is a data structure that uses a single, fixed-size buffer as if it were connected end-to-end. This structure configured for buffering data streams.

If ("No") there is not a hit in circular buffer 280 for line X, metadata predictor 200 is configured to set (branch) metadata presence information corresponding to line X to a default setting at block 1812. The default setting could be the value of all ones ("1's") for the branch metadata presence information, and this default setting information can be sent to a multiplexer in order for metadata predictor 200 to write the (branch) metadata presence information to metadata presence table 270 at block 1814.

If ("Yes") there is hit in circular buffer 280, metadata predictor 200 is configured to determine that the metadata presence information is equal to (i.e., the same as) the content in circular buffer 280 at block 1810, and metadata predictor 200 is configured to send (branch) metadata presence information from circular buffer 280 corresponding to line X to the multiplexer in order for metadata predictor 200 to write the (branch) metadata presence information to metadata presence table 270 at block 1814.

At block 1816, metadata predictor 200 is configured to check if there was a search of BTB1 206 and/or a search of BTB2 240 that found (branch) metadata presence information. If ("No") there was no metadata presence information found, metadata predictor 200 is configured to check if there was a surprise branch completion at block 1818. If not, flow proceeds to block 1802. If ("Yes") there was metadata presence information found and/or if ("Yes") there was a surprise branch completion, metadata predictor 200 is configured to determine that (branch) metadata presence information is known/available (i.e., there is metadata presence knowledge that needs to be prepared for storage) at block 1820.

At block 1822, metadata predictor 200 is configured to check if the cache line is known in the instruction cache 260 by, for example, checking if there is a set predictor shadow table hit in set predictor shadow table 272 for the same search query and/or BTB1 index (that previously occurred at block 1816) for line X. If there is a known and/or identified cache line, for example, line X such that the (branch) metadata presence is in set predictor shadow table 272 for the cache line, flow proceeds to block 1814 in order to write the (branch) metadata presence information in metadata presence table 270 for line X.

If ("No") there is not a cache line in instruction cache 260 (e.g., line X is not in instruction cache 260 and/or has been evicted from instruction cache 260), which corresponds to not having the (branch) metadata presence information for line X in set predictor shadow table 272, metadata predictor 200 is configured to write the (branch) metadata presence information in circular buffer 280 at block 1824.

Figure 19:
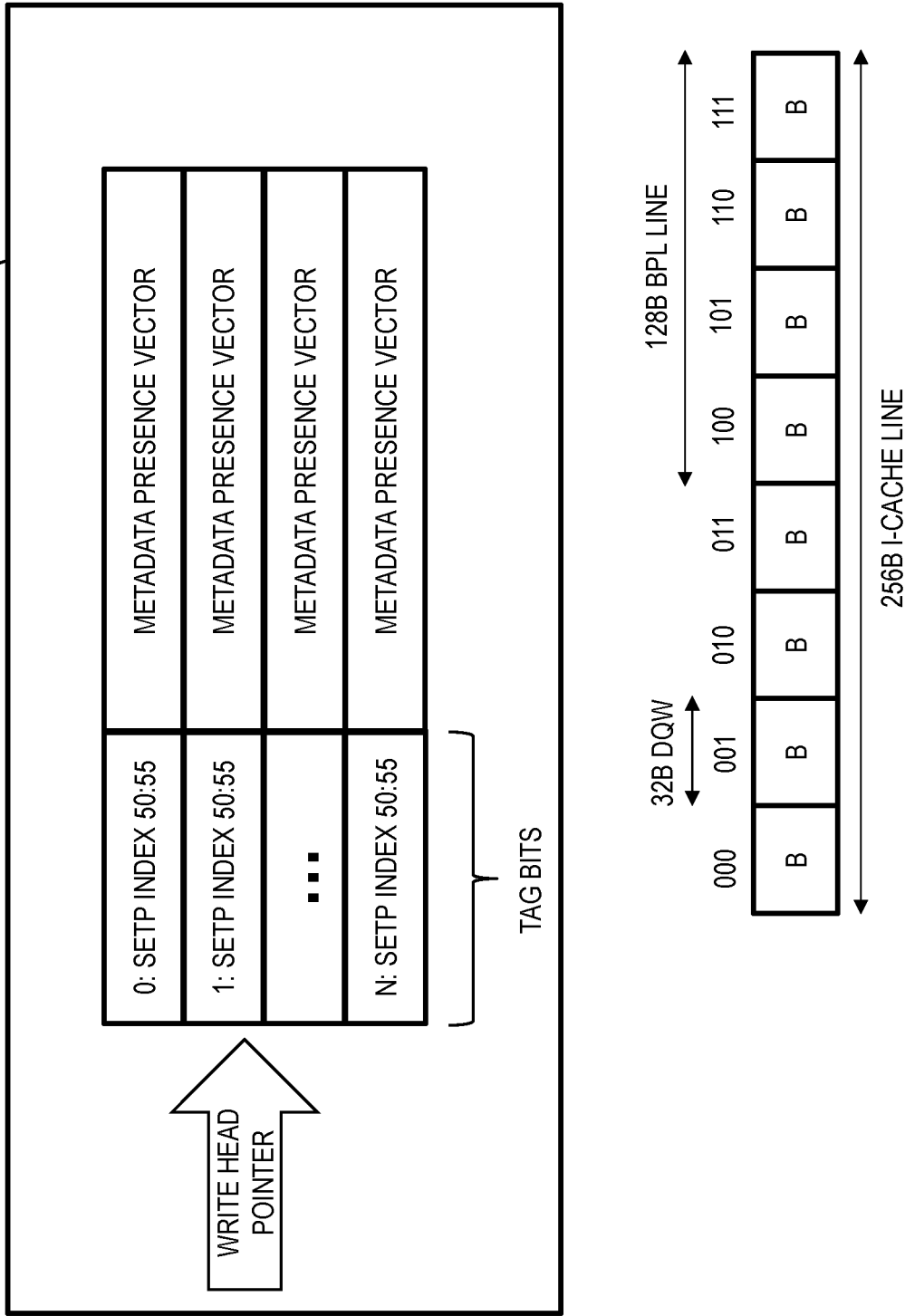
FIG. 19 depicts a block diagram of an example circular buffer in accordance with one or more embodiments of the present invention.

FIG. 19 depicts a block diagram of an example circular buffer 280 in accordance with one or more embodiments. Circular buffer 280 includes the tag bits which are utilized to compare for a match with the search query (e.g., BTB1 index bits), along with the corresponding (branch) metadata presence information for each corresponding line of metadata.

Figure 20:
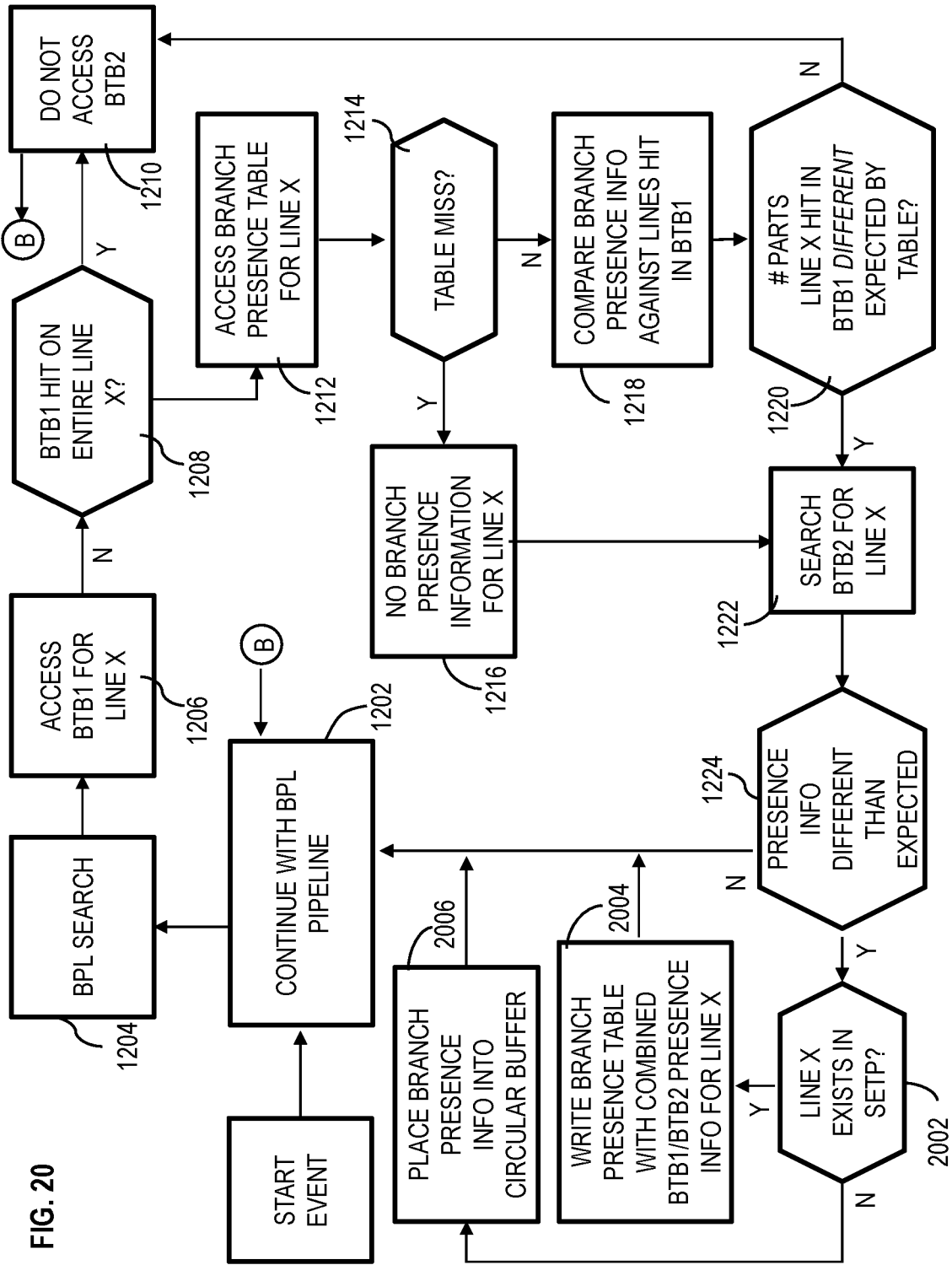
FIG. 20 is a flowchart depicting a modification to the flowchart in FIG. 12 in accordance with one or more embodiments of the present invention.

FIG. 20 is a flowchart depicting a modification to the flowchart in FIG. 12 according to one or more embodiments. Without repeating the discussion of FIG. 12, FIG. 20 shows that if the line of metadata (e.g., line X) does not exist in set predictor shadow table 272, flow proceeds to block 2006. If the line of metadata (e.g., line X) does exist in set predictor shadow table 272, flow proceeds to block 2004.

Figure 21:
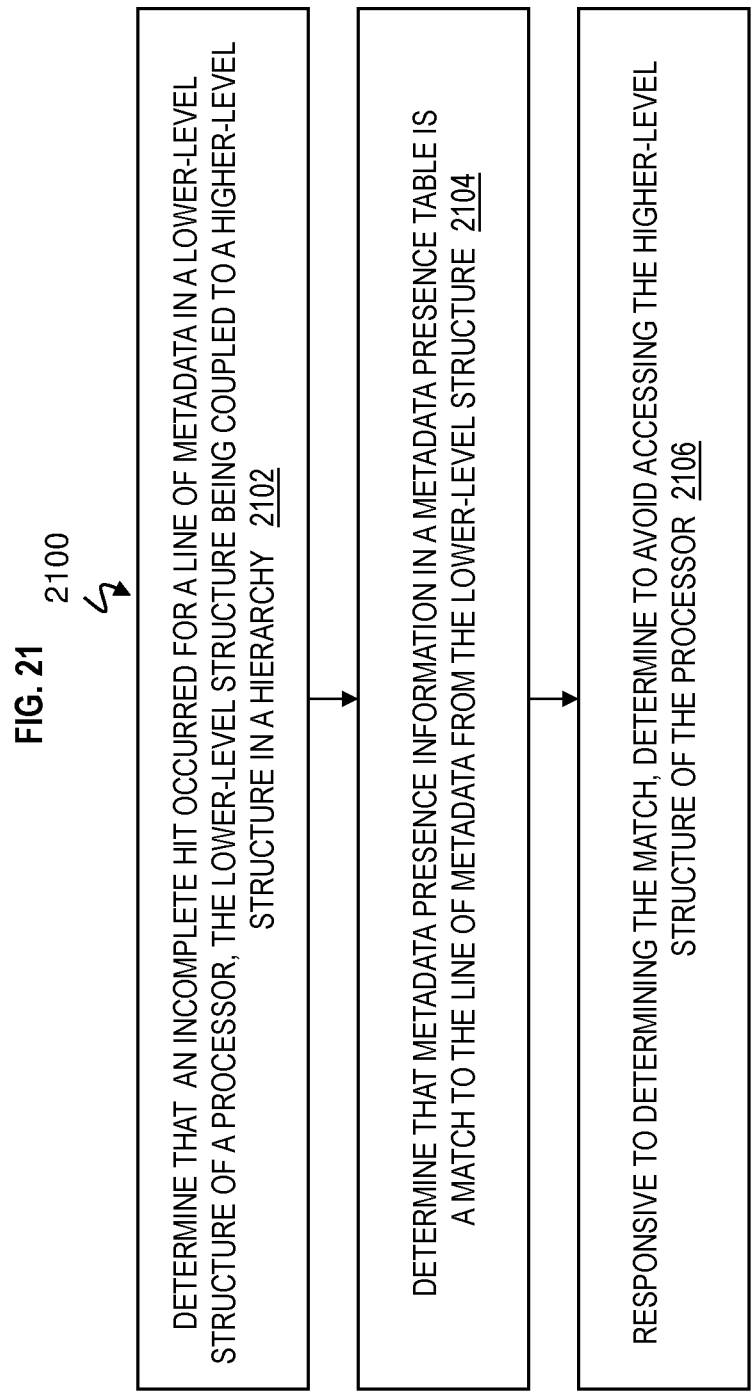
FIG. 21 is a flowchart of a computer-implemented method for using metadata presence information to determine when to access a higher-level metadata table in a metadata predictor of a processor in accordance with one or more embodiments of the present invention.

FIG. 21 is a flowchart of a computer-implemented method 2100 for using metadata presence information to determine when to access a higher-level metadata table (e.g., BTB2 240) in a metadata predictor 200 of processor 101 in accordance with one or more embodiments of the invention. Computer-implemented method 2100 may be performed using computer system 100 in FIG. 1. Processors 101 in FIG. 1 along with any other processor discussed herein can include and/or implement functions of metadata predictor 200 discussed herein. As noted herein, functions of processor 101 can be used and/or implemented in hardware components of hardware and software layer 60 depicted in FIG. 30.

At block 2102 of computer-implemented method, metadata predictor 200 is configured to determine that an incomplete hit occurred for a line of metadata in a lower-level structure (e.g., BTB1 206) of a processor (e.g., processor 101), the lower-level structure being coupled to a higher-level structure (e.g., BTB2 240) in a hierarchy. A complete hit has a value (e.g., "1") identifying that branch information is present in each part/component of (branch) metadata information for the line of metadata, where each part/component can be a double quad word (DQW), as depicted in, for example, FIG. 13. In FIG. 13, the BTB1 206 has hit on all parts/components of the 128B line of metadata, which are identified by the value of "1" in each 32 bit double quad word. An incomplete hit has less than a full hit for the line of metadata and/or does not have branch presence information identified by the value of "1" in each (and every) 32 bit double quad word for the line of metadata, as depicted in, for example, FIG. 14. Any branch presence information that does not have the value of "1" identified for each part/component of the line of metadata is an incomplete hit and/or partial hit, while having the value of "1" for at least one part/component but not all. At block 2104, metadata predictor 200 is configured to determine that metadata presence information in a metadata presence table 270 is a match to the line of metadata from the lower-level structure (e.g., BTB1 206). At block 2106, metadata predictor 200 is configured to, responsive to determining the match, determine to avoid accessing the higher-level structure (e.g., BTB2 240) of the processor (e.g., processor 101).

In one or more embodiments, the metadata presence information identifies a presence of one or more branches different from the line of metadata. For example, FIG. 15 illustrates that the metadata presence table vector identifies the presence of branches in the second and fourth parts/components different from the metadata presence information in the BTB1 presence vector.

Metadata predictor 200 is configured to, responsive to determining that the metadata presence information in the metadata presence table 270 identifies a presence of one or more branches different from the line of metadata, access the higher-level structure (e.g., BTB2 24) for the line of metadata. Metadata predictor 200 is configured to stall a prediction pipeline 554 and access the higher-level structure (e.g., BTB2 240) for the line of metadata, responsive to the metadata presence information identifying a presence of one or more branches different from the line of metadata. Metadata predictor 200 is configured to, responsive to determining a miss associated with an instruction cache 260 (e.g., a miss in set predictor shadow table 272) and responsive to determining that the incomplete hit occurred for the line of metadata in the lower-level structure (e.g., BTB1 206, access the higher-level structure (e.g., BTB2 240) for the line of metadata; responsive to determining a hit associated with the instruction cache (e.g., a hit in set predictor shadow table 272), responsive to determining that the incomplete hit occurred for the line of metadata in the lower-level structure, and responsive to determining that the metadata presence information in the metadata presence table identifies a presence of one or more branches different from the line of metadata, metadata predictor 200 is configured to access the higher-level structure (e.g., BTB2 240) for the line of metadata.

Responsive to a given metadata presence information being known/available, metadata predictor 200 is configured to write the given metadata presence information into the metadata presence table 270 based on an associated instruction line being in an instruction cache 260 (e.g., a hit in set predictor shadow table 272). Responsive to a given metadata presence information being known/available, metadata predictor 200 is configured to write the given metadata presence information into a buffer (e.g., circular buffer 280), confirm that an associated instruction line is in a set predictor table (e.g., set predictor table 262 and/or set predictor shadow table 272), and write the given metadata presence information from the buffer (e.g., circular buffer 280) into the metadata presence table 270, responsive to the confirming.

Figure 22:
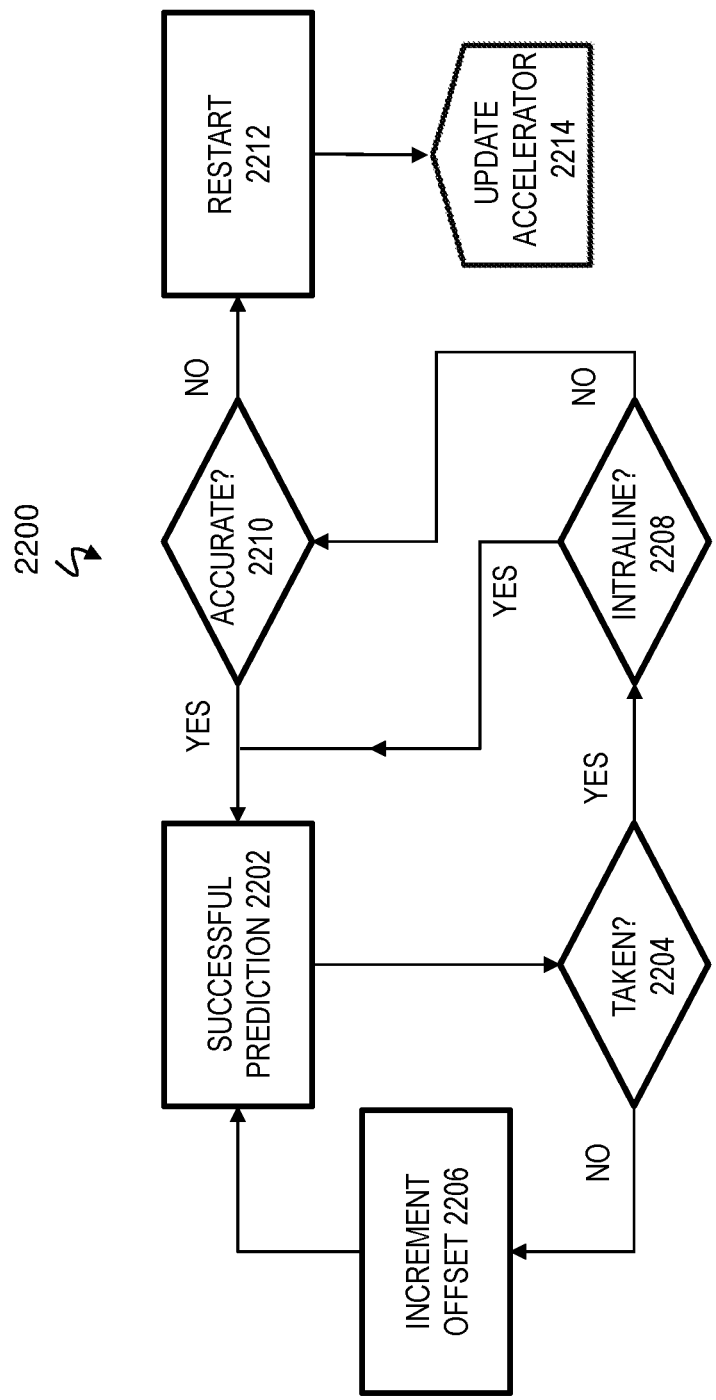
FIG. 22 is flowchart of an accelerator flow for writing to a line index accelerator in accordance with one or more embodiments of the present invention.

To illustrate details of line index accelerator 202 in metadata predictor 200, FIG. 22 is flowchart of an accelerator flow 2200 for writing to line index accelerator 202 according to one or more embodiments. Line index accelerator 202 can include and/or utilize accelerator logic 222 to perform accelerator flow 2200 as well as accelerator flow 2300 discussed below in FIG. 23.

At block 2202 of accelerator flow 2200, line index accelerator 202 is configured to receive a successful prediction. The successful prediction can be received as output from prediction pipeline 554 and/or from instruction execution pipeline 250. The successful prediction can be for an instruction address having a branch, which could be taken or not taken. At block 2204, line index accelerator 202 is configured to check whether the branch was taken or not taken. If ("No") the branch was not taken, line index accelerator 202 is configured to increment the offset at block 2206, and flow returns to block 2202. Nothing is written to line index accelerator 202. Incrementing the offset refers to processing the next line of metadata that is prepared to be stored in the line index accelerator because the line index accelerator did not find a taken branch. If "Yes" the branch was taken, line index accelerator 202 is configured to check if the branch taken was intraline at block 2208. As noted herein, intraline refers to the target address being on the same line of metadata as the instruction address being searched (i.e., the entry instruction address and target address are on the same line of metadata). If "Yes" the target address for the branch taken is intraline, line index accelerator 202 is configured to return to block 2202, and nothing is written to line index accelerator 202. On the other hand, if ("No") the target address for the branch taken is not intraline, line index accelerator 202 is configured to check if the target address for the branch taken is accurate at block 2210. If "Yes" the target address is accurate, flow proceeds to block 2202, and nothing is written to line index accelerator 202. In other words, the next line needed for the target address is already in the index pipeline 552 and prediction pipeline 554. If ("No") the target address for the branch taken is not accurate, line index accelerator 202 is configured to restart the line index accelerator 202 at block 2212, and update line index accelerator 202 at block 2214. Updating line index accelerator 202 can include adding the correct target address for the branch taken such that the correct target address will be available for the branch taken. Also, updating line index accelerator 202 can include updating the branch offset and any tag information used to determine a hit.

Figure 23:
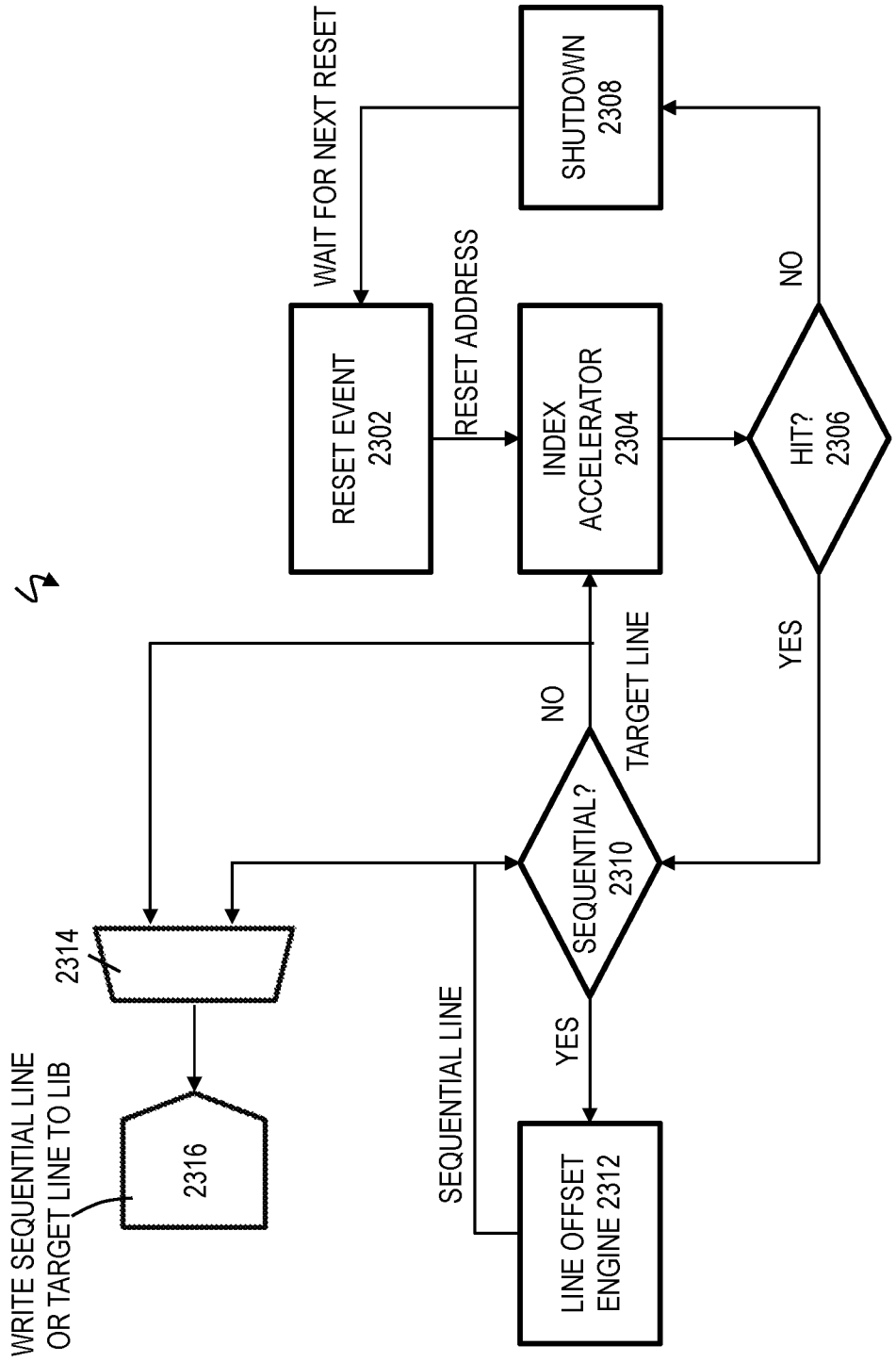
FIG. 23 is flowchart of an accelerator flow for reading a line index accelerator in accordance with one or more embodiments of the present invention.

FIG. 23 is flowchart of an accelerator flow 2300 for reading out line index accelerator 202 to LIB 204 according to one or more embodiments. Line index accelerator 202 can include and/or utilize accelerator logic 222 to perform accelerator flow 2300. At block 2302 of accelerator flow 2300, line index accelerator 202 is configured to receive a reset event, which has an instruction address as the reset address. An example reset event can be a branch wrong. At block 2304, line index accelerator 202 is configured to use the reset address to index (e.g., query) line index accelerator 202. At block 2306, line index accelerator 202 is configured to check whether the reset address is a hit in line index accelerator 202. If ("No") there is no hit from the instruction address (i.e., the reset address), line index accelerator 202 is configured to shut down line index accelerator 202 and wait from the next reset address at block 2308. If "Yes" there is a hit from the instruction address (i.e., the reset address), line index accelerator 202 is configured to check if the line read out from line index accelerator 202 needs a sequential line at block 2310. If ("No") the line read out from line index accelerator 202 does not need a sequential line, line index accelerator 202 is configured to multiplex the line (i.e., the target line) that was read out at block 2314 such that the line is written to LIB 204 at block 2316. Also, flow returns to block 2304 such that the line (i.e., the target line) that was read out is used to query/index line index accelerator 202 for the next exit branch.

If "Yes" the line read out from line index accelerator 202 needs a sequential line, line index accelerator 202 is configured to perform line offset in order to output the sequential line at block 2312. At block 2314, line index accelerator 202 is configured to multiplex the sequential line to LIB 204 and write the sequential line to LIB 204 at block 2316. For example, if the line read out from line index accelerator 202 is line X, line index accelerator 202 is configured to perform line offset to obtain line X+1, where line X+1 corresponds to a subset of instruction address bits needed to search for line X+1 in BTB1 206; therefore, line index accelerator 202 causes line X+1 to be stored immediately after line X in LIB 204. Performing the line offset refers to adding a predetermined number of bits to the previous line (e.g., line X) in order create the sequential line (e.g., line X+1) which is used as the index to query the corresponding line of metadata for the sequential line in BTB1 206. Since each line of metadata in BTB1 206 is in a known format (e.g., the line of metadata is 128B), the offset is a fixed amount to move to the next line (i.e., the sequential line). The sequential line (e.g., sequential line X+1) is fed back to block 2310; line index accelerator 202 is configured to check whether another sequential line is needed, and if so the line offset is added at block 2312, in order to generate the next sequential line such as, for example, sequential line X+2. This loop can continue for three times in one or more embodiments, resulting in sequential lines X+1, X+2, X+3 each of which is written to LIB 204. In one or more embodiments, sequential lines X+1, X+2, X+3 can be written serially to LIB 204. In one or more embodiments, sequential lines X+1, X+2, X+3 can all be written at simultaneously, for example, in parallel to LIB 204.

Figure 24:
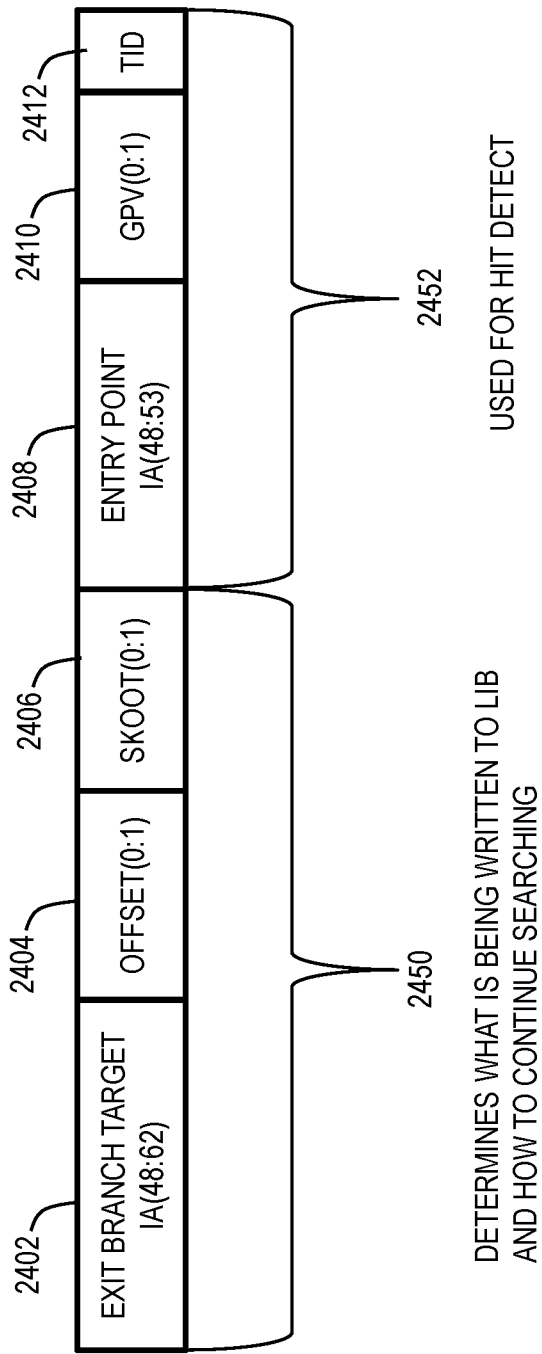
FIG. 24 depicts a block diagram of an example latency accelerator entry of a line index accelerator in accordance with one or more embodiments of the present invention.

FIG. 24 is a block diagram of an example latency accelerator entry of line index accelerator 202 in accordance with one or more embodiments. The example accelerator entry has a first part 2450 that is used to determine what is written (stored) to LIB 204 and how to continue searching line index accelerator 202. Once line index accelerator 202 no longer needs to generate sequential lines, the target of the exit branch is fed back to line index accelerator 202 to read a new line, which is the search. The first part 2450 of example accelerator entry includes the exit branch target field 2402, for example, as instruction address bit 48:62, the offset field 2404 as bits 0:1, and the SKOOT field 2406 as bits 0:1.

The second part 2452 of the example accelerator entry is used for hit detection within line index accelerator 202. The second part 2452 includes an entry point field 2408, for example, as instruction address bits 48:53, a global path vector (GPV) field 2410 as instruction address 0:1, and a transaction register (TID) field 2412.

Figure 25:
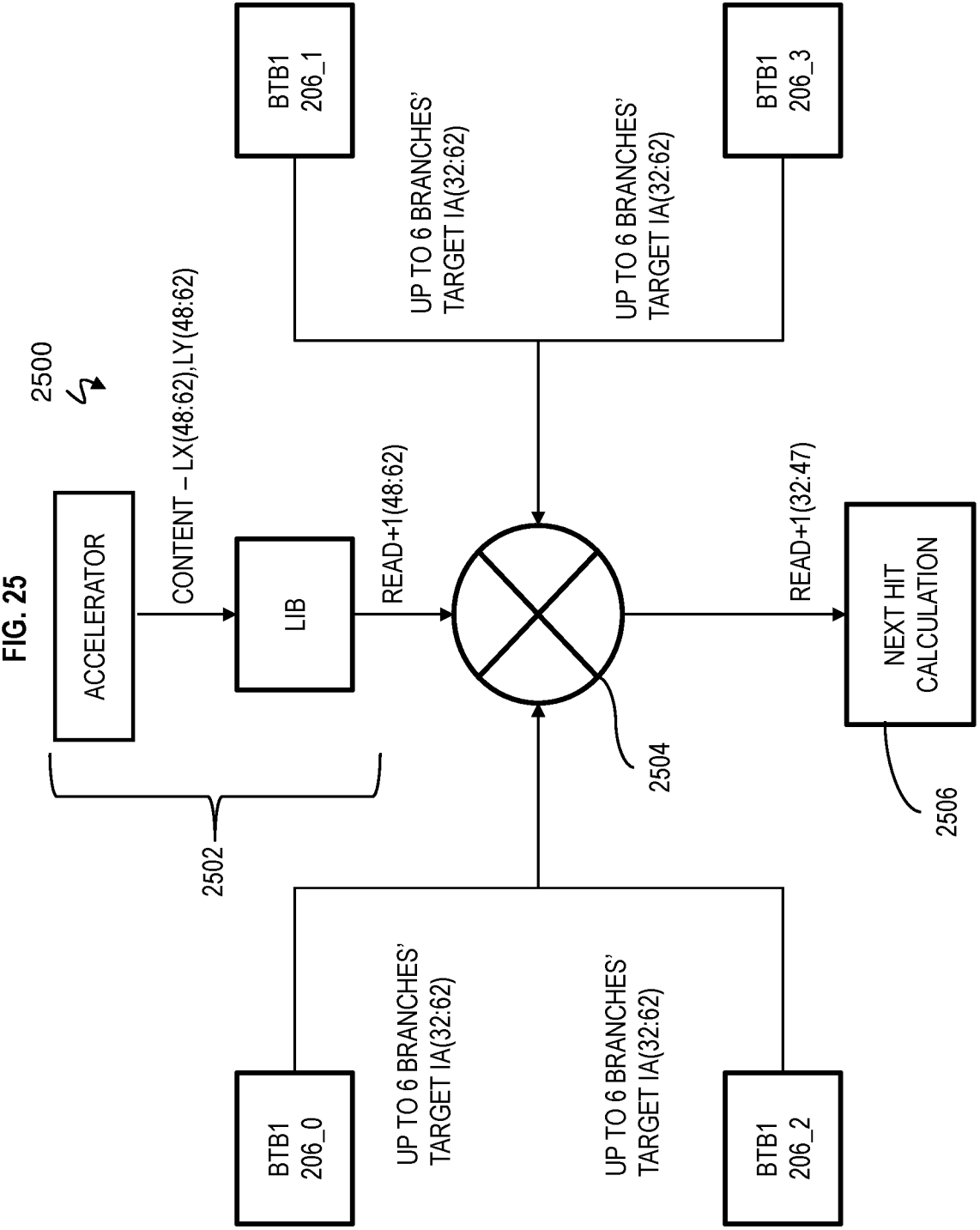
FIG. 25 is flowchart of an accelerator flow for performing payload matching in accordance with one or more embodiments of the present invention.

FIG. 25 is flowchart of an accelerator flow 2500 for performing payload matching according to one or more embodiments. Line index accelerator 202 can include and/or utilize accelerator logic 222 to perform accelerator flow 2500. Payload matching combines BTB1 data with accelerator data in order to find instruction address bits required for hit detection. At blocks 2502, 2504 of accelerator flow 2500, line index accelerator 202 is configured to index (search) LIB 204 using content, which is instruction address bits for line of metadata, and to "OR" the output. In one or more embodiments, line index accelerator 202 could multiplex (mux) the output from BTB1. Payload matching uses the IA(48:62) of two LIB entries (which are X(48:62) and Y(48:62) in this example to find Y(32:47), where Y(32:47) is needed for the next search. While line index accelerator 202 does not need Y(32:47) to query the BTB1 during the next search, line index accelerator 202 will need Y(32:47) for hit detection, for example, in block 514 discussed herein. The tags are bits Y(32:47) of the current search line. The BTB1 contains bits 32:47 of the 128B line that has been read out (e.g., which may be called BTB1(32:47)). In order to determine that there is a hit, Y(32:47) and BTB1(32:47) must match, otherwise, what has been read is for a different line. Payload matching looks at all of the target addresses of the current search X, in order to find Y(32:47) for the next search. The BTB1 206 can be operated in a parent-based design, where BTB1 206 is split or operated in four sections BTB1 206_0, BTB1 206_1, BTB1 206_2, BTB1 206_3 (generally referred to as BTB1 206). After being indexed (e.g., searched), each BTB1 206_0, BTB1 206_1, BTB1 206_2, BTB1 206_3 provides its output. In one or more embodiments, each BTB1 206_0, BTB1 206_1, BTB1 206_2, BTB1 206_3 can output the target instruction address bit (32:62) for up to six branches.

Figure 26:
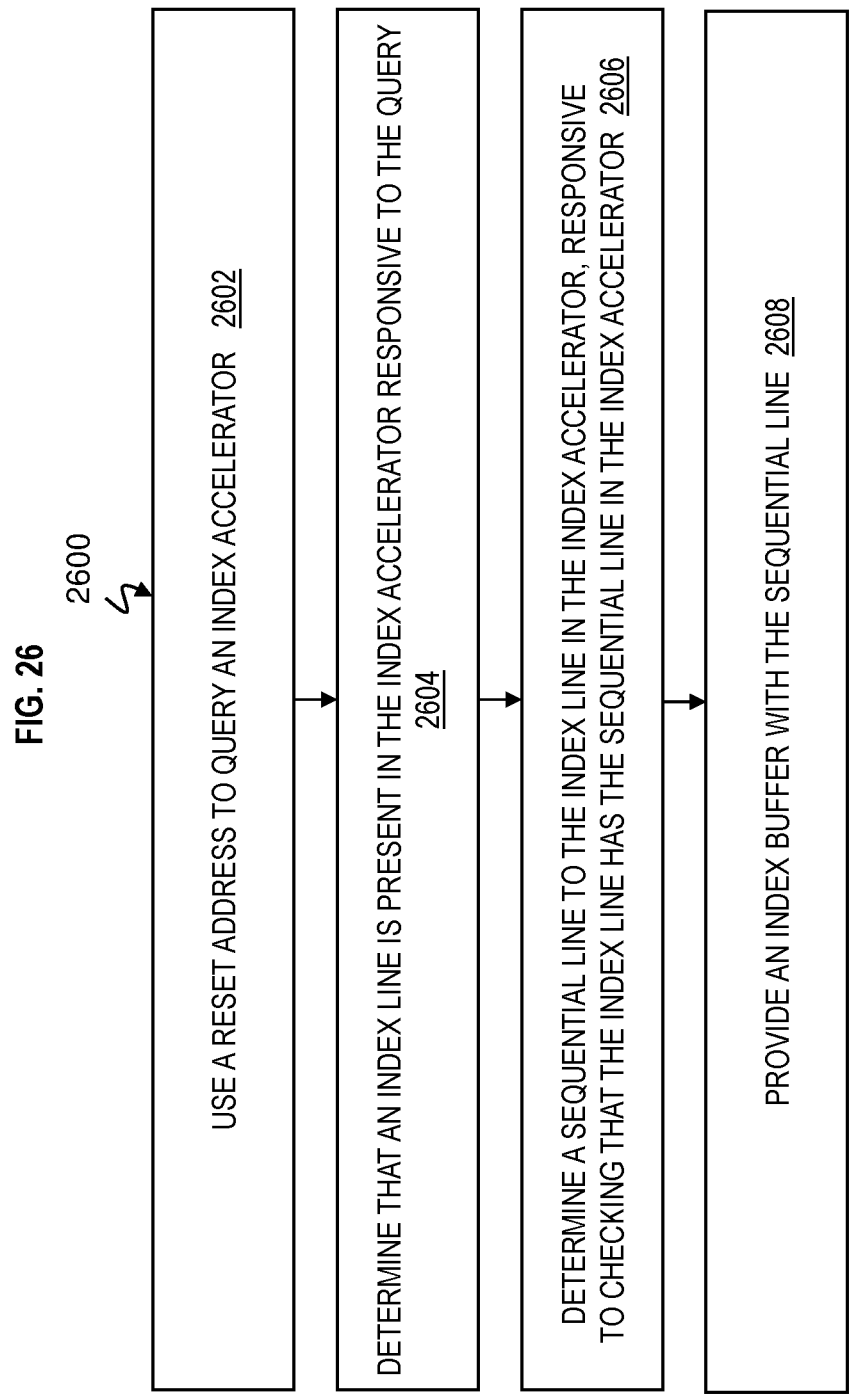
FIG. 26 is a flowchart of a computer-implemented method for using the line index accelerator to determine indices for a line index buffer in the metadata predictor in accordance with one or more embodiments of the present invention.

FIG. 26 is a flowchart of a computer-implemented method 2600 for using line index accelerator 202 to determine indices for LIB 204 in metadata predictor 200 before the indices are needed to read out BTB1 206 to LOB 208 in accordance with one or more embodiments of the invention. Computer-implemented method 2600 may be performed using computer system 100 in FIG. 1. Processors 101 in FIG. 1 along with or any other processor discussed herein can include and/or implement functions of metadata predictor 200 discussed herein. As noted herein, functions of processor 101 can be used and/or implemented in hardware components of hardware and software layer 60 depicted in FIG. 26.

At block 2602 of computer-implemented method 2600, metadata predictor 200 is configured to use a reset address to query an index accelerator (e.g., line index accelerator 202). At block 2604, metadata predictor 200 is configured to determine that an index line (e.g., line X) is present in the index accelerator (e.g., line index accelerator 202) responsive to the query. At block 2606, metadata predictor 200 is configured to determine a sequential line to the index line in the index accelerator (e.g., line index accelerator 202), responsive to checking that the index line has the sequential line in the index accelerator. For example, line index accelerator 202 is configured to check that it contains a sequential line, for example, sequential line X+1, to the index line (e.g., line X). At block 2608, metadata predictor 200 is configured to provide (write) an index buffer with the sequential line.

The index accelerator is configured to determine one or more other sequential lines (e.g., sequential lines X+2, X+3) based on the index line (e.g., line X). The index accelerator (e.g., line index accelerator 202) is configured to provide the index buffer with the sequential line and the one or more other sequential lines in advance of the sequential line and the one or more other sequential lines being required by a prediction pipeline (e.g., prediction pipeline 554 and/or instruction execution pipeline 250). The index line includes an exit target instruction address of a branch for a given entry instruction address.

There are many technical benefits and technical solutions by using a processor having a line index accelerator in accordance with one or more embodiments. The line index accelerator keeps the index pipeline ahead of prediction pipeline, which means that the LIB has and uses indices to read out the BTB1 to the LOB before output from the LOB is needed to generate a prediction. For example, the line index accelerator reduces prediction latency from 4 cycles to 2 cycles once primed in one or more embodiments. Also, the line index accelerator causes delays in the index pipeline to have less impact on prediction latency because the index pipeline can read ahead, as a result of the indices provided in advance by the index accelerator to the LIB. As more technical benefits and solutions, the line index accelerator is configured to ignore (and/or not take into account) intraline branches, thereby allowing the prediction pipeline to exploit the metadata prediction cache (e.g., LOB) without influencing the index pipeline; this effectively makes the capacity of the latency accelerator larger. One or more embodiments using the line index accelerator allow for set associativity, such that multiple useful exit branches can be saved at the same index. As additional technical benefits and solutions, one or more embodiments limit the number of address bits (e.g., to be stored in the line index accelerator) needed to traverse branch predictions through code, by leveraging performing a BTB1 read to find remaining instruction address bits during payload matching. This allows for use of small line index accelerator and LIB arrays.

Figure 27:
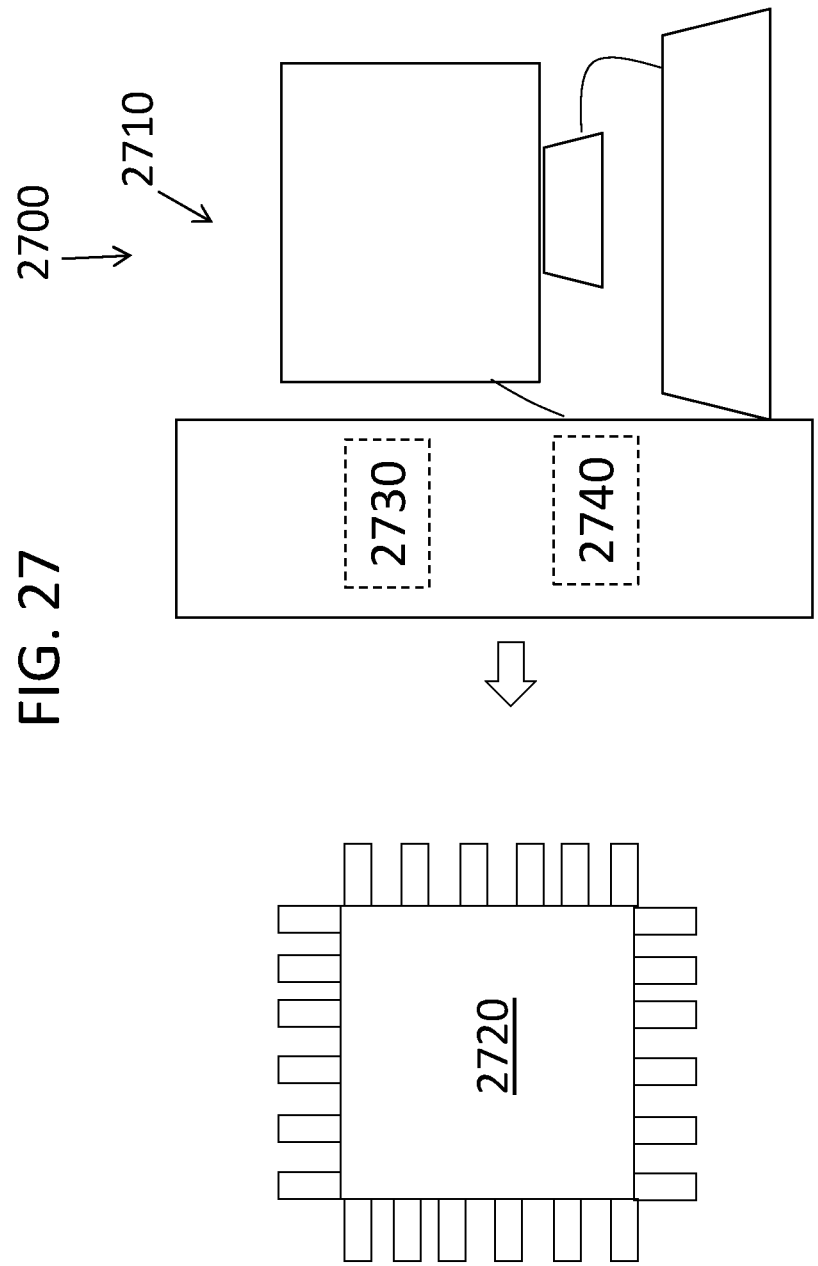
FIG. 27 is a block diagram of a system to design/layout a metadata predictor in accordance with one or more embodiments of the present invention.

FIG. 27 is a block diagram of a system 2700 for metadata predictor 200 of processor 101 according to embodiments of the invention. The system 2700 includes processing circuitry 2710 used to generate the design 2730 (which includes metadata predictor 200) that is ultimately fabricated into an integrated circuit 2720. The steps involved in the fabrication of the integrated circuit 2720 are well-known and briefly described herein. Once the physical layout 2740 is finalized, based, in part, on the metadata predictor 200 according to embodiments of the invention to facilitate optimization of the routing plan, the finalized physical layout 2740 is provided to a foundry. Masks are generated for each layer of the integrated circuit based on the finalized physical layout. Then, the wafer is processed in the sequence of the mask order. The processing includes photolithography and etch. This is further discussed with reference to FIG. 28.

Figure 28:
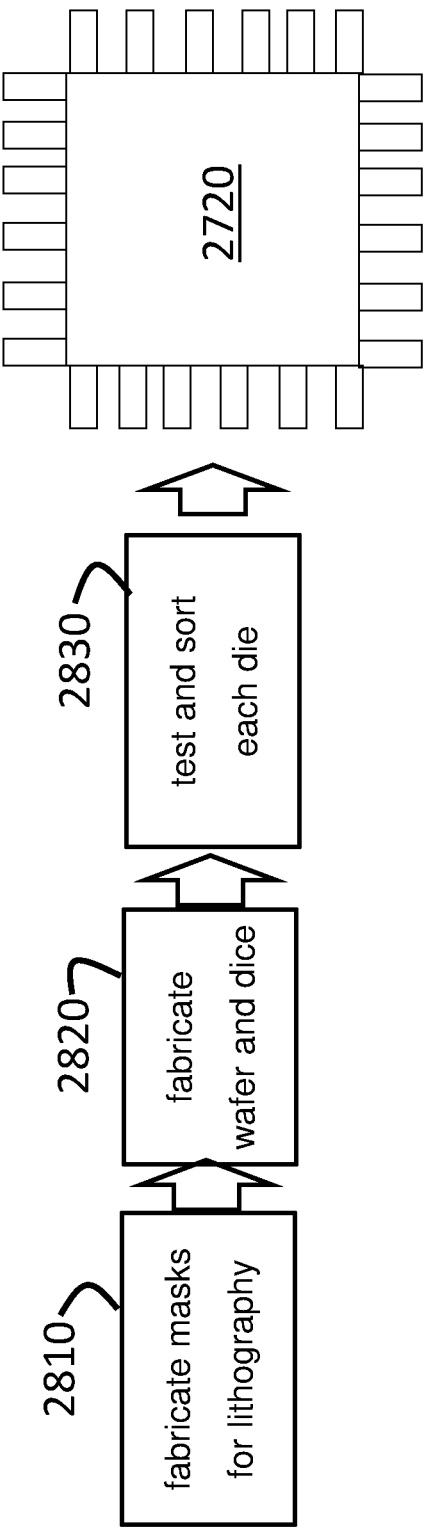
FIG. 28 is a process flow of a method of fabricating the integrated circuit of FIG. 27 in accordance with one or more embodiments of the present invention.

FIG. 28 is a process flow of a method of fabricating the integrated circuit according to exemplary embodiments of the invention. Once the physical design data is obtained, based, in part, on the metadata predictor 200 of processor 101, the integrated circuit 2720 can be fabricated according to known processes that are generally described with reference to FIG. 28. Generally, a wafer with multiple copies of the final design is fabricated and cut (i.e., diced) such that each die is one copy of the integrated circuit 2720. At block 2810, the processes include fabricating masks for lithography based on the finalized physical layout. At block 2820, fabricating the wafer includes using the masks to perform photolithography and etching. Once the wafer is diced, testing and sorting each die is performed, at block 2830, to filter out any faulty die.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 29:
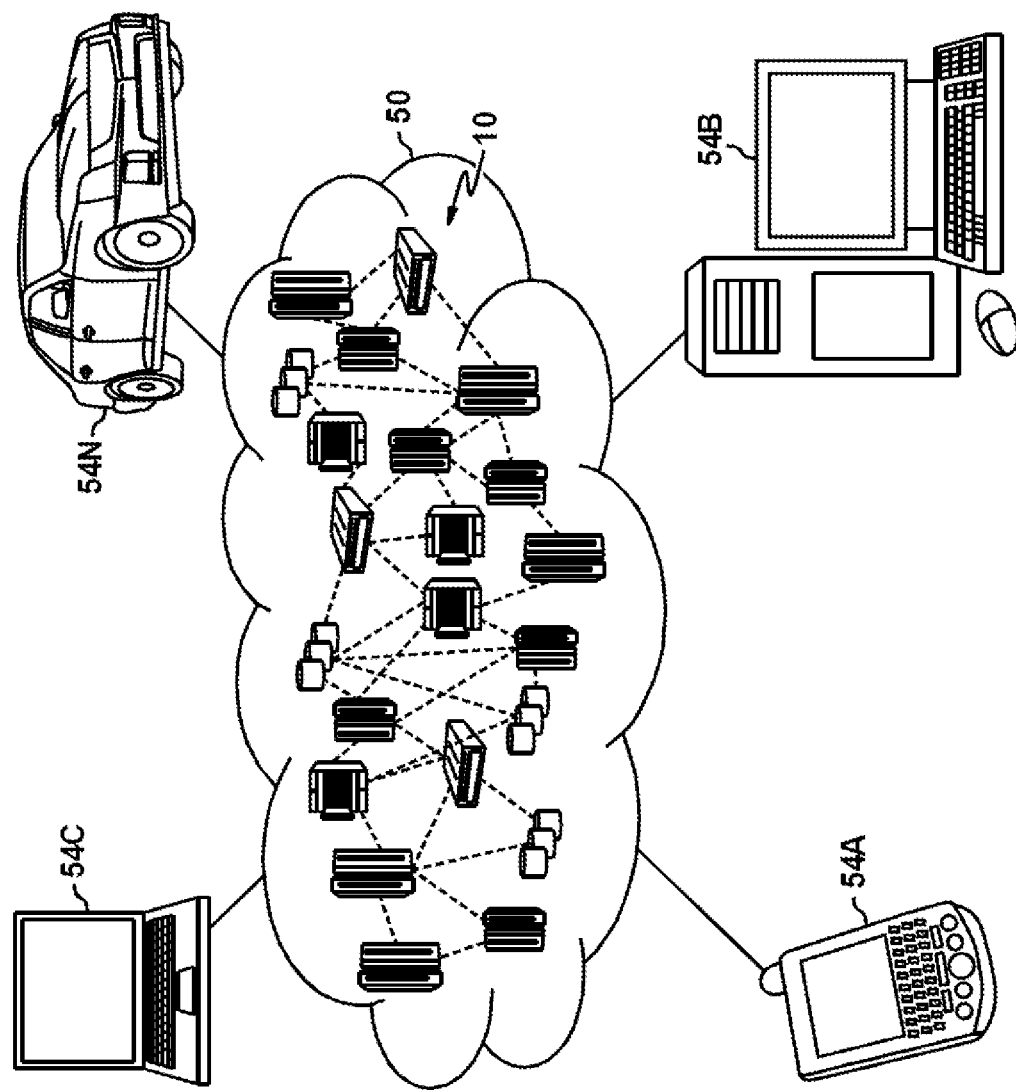
FIG. 29 depicts a cloud computing environment according to one or more embodiments of the present invention.

Referring now to FIG. 29, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 29 are intended to be illustrative only and that computing nodes 10 and cloud computing environment 50 can communicate with any type of computerized device over any type of network and/or network addressable connection (e.g., using a web browser).

Figure 30:
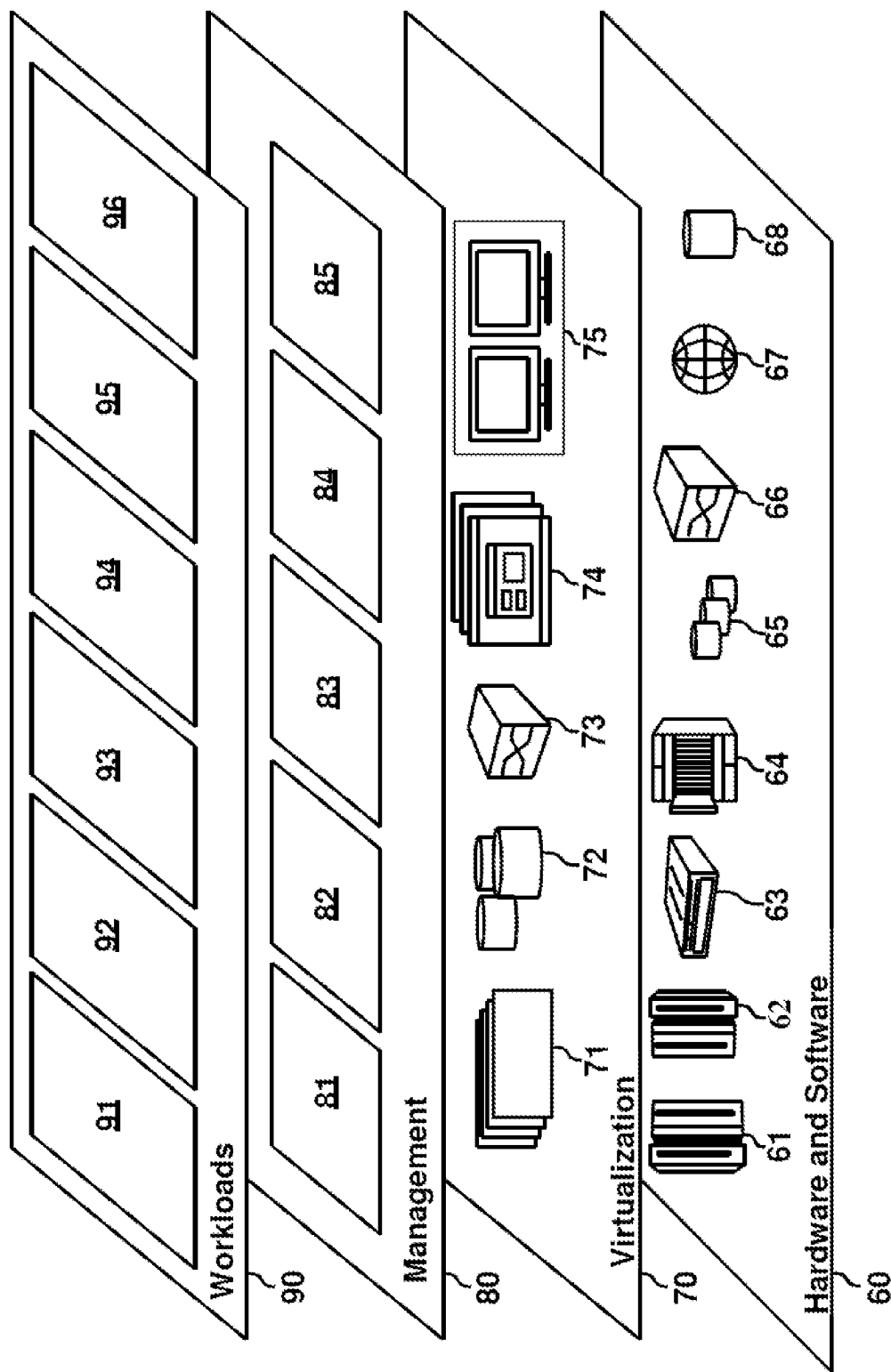
FIG. 30 depicts abstraction model layers according to one or more embodiments of the present invention.

Referring now to FIG. 30, a set of functional abstraction layers provided by cloud computing environment 50 (FIG. 29) is shown. It should be understood in advance that the components, layers, and functions shown in FIG. 31 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    determining, by a processor, that an incomplete hit occurred for a line of metadata in a lower-level structure of the processor, the lower-level structure being coupled to a higher-level structure in a hierarchy, the line of metadata comprising parts, wherein the incomplete hit identifies branch information for at least one of the parts but does not identify branch information for another one of the parts;

determining, by the processor, that metadata presence information in a metadata presence table of the processor is a match to the line of metadata from the lower-level structure, the metadata presence table comprising the parts of the line of metadata that are known by the lower-level structure and the higher-level structure;

responsive to determining a hit associated with an instruction cache, responsive to determining that the incomplete hit occurred for the line of metadata in the lower-level structure, and responsive to determining that the metadata presence information in the metadata presence table identifies a presence of one or more branches different from the line of metadata, accessing the higher-level structure for the line of metadata; and responsive to determining the match, determining, by the processor, to avoid accessing the higher-level structure of the processor in order to improve performance of the processor.

2. The computer-implemented method of claim 1, wherein the metadata presence information identifies a presence of one or more branches different from the line of metadata; and wherein the lower-level structure, the higher-level structure, and the metadata presence table are different hardware structures on the processor.

3. The computer-implemented method of claim 1 further comprising, responsive to determining that the metadata presence information in the metadata presence table identifies a presence of one or more branches different from the line of metadata, accessing the higher-level structure for the line of metadata.

4. The computer-implemented method of claim 1 further comprising stalling a prediction pipeline and accessing the higher-level structure for the line of metadata, responsive to the metadata presence information identifying a presence of one or more branches different from the line of metadata.

5. The computer-implemented method of claim 1 further comprising:
responsive to determining a miss associated with the instruction cache and responsive to determining that the incomplete hit occurred for the line of metadata in the lower-level structure, accessing the higher-level structure for the line of metadata.

6. The computer-implemented method of claim 1 further comprising, responsive to a given metadata presence information being available, writing the given metadata presence information into the metadata presence table based on an associated instruction line being in an instruction cache.

7. The computer-implemented method of claim 1 further comprising: responsive to a given metadata presence information being available, writing the given metadata presence information into a buffer; confirming that an associated instruction line is in a set predictor table; and writing the given metadata presence information from the buffer into the metadata presence table, responsive to the confirming.

8. The computer-implemented method of claim 1, wherein determining that the incomplete hit occurred for the line of metadata in the lower-level structure and determining that the metadata presence information in the metadata presence table is the match to the line of metadata from the lower-level structure are executed asynchronously to an instruction pipeline.

9. A system comprising:
a memory having computer readable instructions; and
one or more processors for executing the computer readable instructions, the computer readable instructions controlling the one or more processors to perform operations comprising:
determining that an incomplete hit occurred for a line of metadata in a lower-level structure of the one or more processors, the lower-level structure being coupled to a higher-level structure in a hierarchy, the line of metadata comprising parts, wherein the incomplete hit identifies branch information for at least one of the parts but does not identify branch information for another one of the parts;
determining that metadata presence information in a metadata presence table of the one or more processors is a match to the line of metadata from the lower-level structure, the metadata presence table comprising the parts of the line of metadata that are known by the lower-level structure and the higher-level structure;
responsive to determining a hit associated with an instruction cache, responsive to determining that the incomplete hit occurred for the line of metadata in the lower-level structure, and responsive to determining that the metadata presence information in the metadata presence table identifies a presence of one or more branches different from the line of metadata, accessing the higher-level structure for the line of metadata; and
responsive to determining the match, determining to avoid accessing the higher-level structure of the one or more processors in order to improve performance of the one or more processors.

10. The system of claim 9, wherein the metadata presence information identifies a presence of one or more branches different from the line of metadata.

11. The system of claim 9, wherein the operations further comprise, responsive to determining that the metadata presence information in the metadata presence table identifies a presence of one or more branches different from the line of metadata, accessing the higher-level structure for the line of metadata.

12. The system of claim 9, wherein the operations further comprise stalling a prediction pipeline and accessing the higher-level structure for the line of metadata, responsive to the metadata presence information identifying a presence of one or more branches different from the line of metadata.

13. The system of claim 9, wherein the operations further comprise:
responsive to determining a miss associated with the instruction cache and responsive to determining that the incomplete hit occurred for the line of metadata in the lower-level structure, accessing the higher-level structure for the line of metadata.

14. The system of claim 9, wherein the operations further comprise, responsive to a given metadata presence information being available, writing the given metadata presence information into the metadata presence table based on an associated instruction line being in an instruction cache.

15. The system of claim 9, wherein the operations further comprise:
responsive to a given metadata presence information being available, writing the given metadata presence information into a buffer; confirming that an associated instruction line is in a set predictor table; and writing the given metadata presence information from the buffer into the metadata presence table, responsive to the confirming.

16. A computer program product comprising a computer readable storage medium having program instructions embodied therewith, the program instructions executable by one or more processors to cause the one or more processors to perform operations comprising:
  determining that an incomplete hit occurred for a line of metadata in a lower-level structure of the one or more processors, the lower-level structure being coupled to a higher-level structure in a hierarchy, the line of metadata comprising parts, wherein the incomplete hit identifies branch information for at least one of the parts but does not identify branch information for another one of the parts;
  determining that metadata presence information in a metadata presence table of the one or more processors is a match to the line of metadata from the lower-level structure, the metadata presence table comprising the parts of the line of metadata that are known by the lower-level structure and the higher-level structure;
  responsive to determining a hit associated with an instruction cache, responsive to determining that the incomplete hit occurred for the line of metadata in the lower-level structure, and responsive to determining that the metadata presence information in the metadata presence table identifies a presence of one or more branches different from the line of metadata, accessing the higher-level structure for the line of metadata; and
  responsive to determining the match, determining to avoid accessing the higher-level structure of the one or more processors in order to improve performance of the one or more processors.

17. The computer program product of claim 16, wherein the metadata presence information identifies a presence of one or more branches different from the line of metadata.

18. The computer program product of claim 16 further comprising, responsive to determining that the metadata presence information in the metadata presence table identifies a presence of one or more branches different from the line of metadata, accessing the higher-level structure for the line of metadata.

19. The computer program product of claim 16 further comprising stalling a prediction pipeline and accessing the higher-level structure for the line of metadata, responsive to the metadata presence information identifying a presence of one or more branches different from the line of metadata.

20. The computer program product of claim 16 further comprising:
  responsive to determining a miss associated with the instruction cache and responsive to determining that the incomplete hit occurred for the line of metadata in the lower-level structure, accessing the higher-level structure for the line of metadata.

* * * * *